(12) United States Patent
Park et al.

(10) Patent No.: US 9,679,211 B2
(45) Date of Patent: Jun. 13, 2017

(54) DISPLAY APPARATUS AND METHOD FOR OPERATING THE SAME FOR PROTECTING PRIVACY

(71) Applicant: LG ELECTRONICS INC., Seoul (KR)

(72) Inventors: Jinyung Park, Seoul (KR); Hyunju Kim, Seoul (KR); Sungeun Kim, Seoul (KR); Jinhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 340 days.

(21) Appl. No.: 13/859,433

(22) Filed: Apr. 9, 2013

(65) Prior Publication Data

US 2014/0085460 A1 Mar. 27, 2014

(30) Foreign Application Priority Data

Sep. 27, 2012 (KR) ........................ 10-2012-0108062

(51) Int. Cl.
| | |
|---|---|
| *G06F 21/32* | (2013.01) |
| *G06K 9/00* | (2006.01) |
| *G09G 3/00* | (2006.01) |
| *G06F 21/84* | (2013.01) |
| *H04M 1/673* | (2006.01) |
| *H04M 1/725* | (2006.01) |

(52) U.S. Cl.
CPC ......... *G06K 9/00892* (2013.01); *G06F 21/32* (2013.01); *G06F 21/84* (2013.01); *G09G 3/001* (2013.01); *H04M 1/673* (2013.01); *H04M 1/72577* (2013.01); *H04M 1/72583* (2013.01); *H04M 1/72563* (2013.01); *H04M 2250/12* (2013.01); *H04M 2250/22* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2007/0280515 A1 | 12/2007 | Goto | |
| 2008/0136587 A1* | 6/2008 | Orr | ........................ G08C 19/00 |
| | | | 340/5.31 |
| 2009/0083847 A1 | 3/2009 | Fadell et al. | |
| 2009/0265754 A1* | 10/2009 | Hinds | ................. G06F 21/6218 |
| | | | 726/1 |

(Continued)

FOREIGN PATENT DOCUMENTS

| | | |
|---|---|---|
| CN | 101075282 A | 11/2007 |
| CN | 100485706 C | 5/2009 |

(Continued)

*Primary Examiner* — Kevin McInnish
(74) *Attorney, Agent, or Firm* — Birch, Stewart, Kolasch & Birch, LLP

(57) ABSTRACT

A display apparatus and a method for operating the same are disclosed. The method for operating a display apparatus includes acquiring biometric information about a user through a camera or a sensor unit, comparing the acquired biometric information with pre-stored authentication information, and switching the display apparatus to a first mode, if the acquired biometric information does not match with the pre-stored authentication information, the first mode restricting access to content predetermined from total content.

8 Claims, 30 Drawing Sheets

(56) References Cited

U.S. PATENT DOCUMENTS

| | | | |
|---|---|---|---|
| 2010/0066697 A1* | 3/2010 | Jacomet et al. | 345/173 |
| 2010/0192209 A1* | 7/2010 | Steeves et al. | 726/7 |
| 2010/0232653 A1 | 9/2010 | Muquit et al. | |
| 2012/0046077 A1* | 2/2012 | Kim | H04M 1/72577 |
| | | | 455/566 |
| 2012/0081282 A1 | 4/2012 | Chin | |
| 2012/0090023 A1* | 4/2012 | Chow | G06F 21/00 |
| | | | 726/19 |
| 2013/0017806 A1* | 1/2013 | Sprigg | H04M 1/66 |
| | | | 455/411 |

FOREIGN PATENT DOCUMENTS

| | | | | |
|---|---|---|---|---|
| CN | 101809581 A | | 8/2010 | |
| CN | 101833563 A | | 9/2010 | |
| CN | 102375949 A | | 3/2012 | |
| JP | 2001142849 A | * | 5/2001 | G06F 15/00 |

* cited by examiner (a)             (b)

FIG. 9
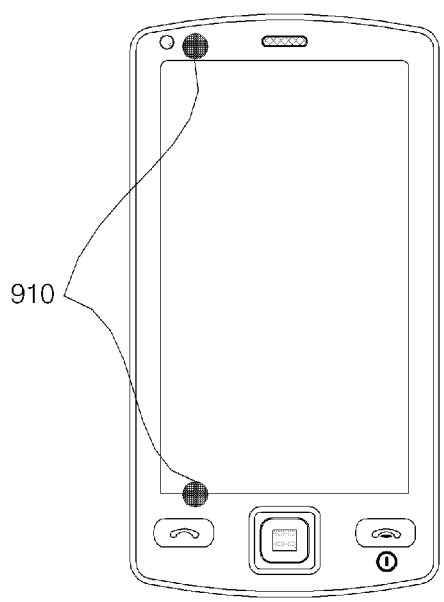
(a)
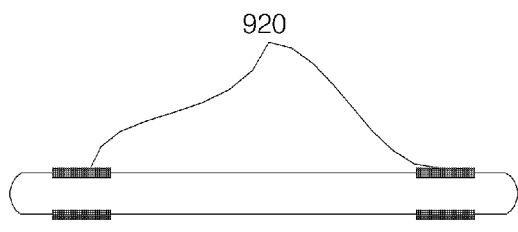
(b)

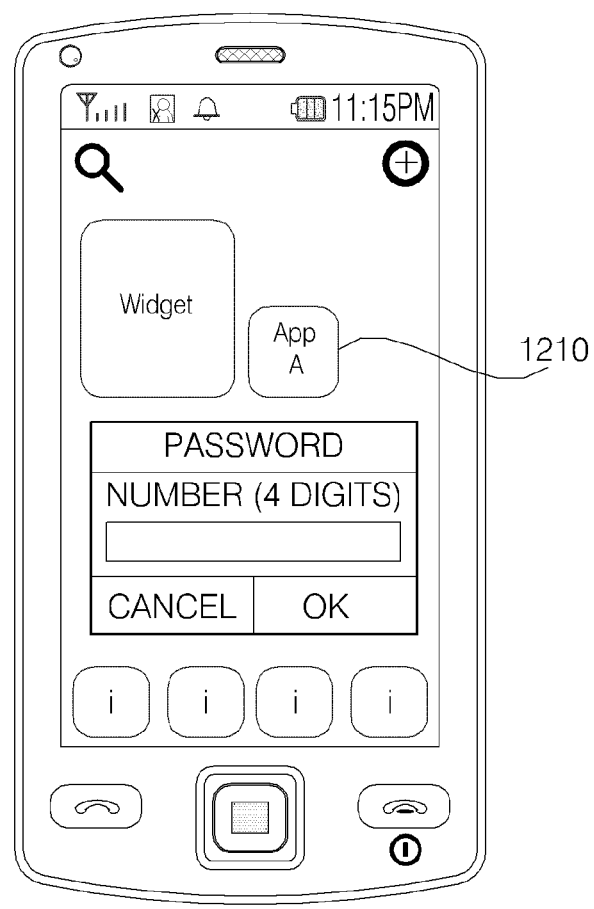

DISPLAY APPARATUS AND METHOD FOR OPERATING THE SAME FOR PROTECTING PRIVACY

CROSS-REFERENCE TO RELATED APPLICATION

This application claims the benefit of Korean Patent Application No. 10-2012-0108062, filed on Sep. 27, 2012 in the Korean Intellectual Property Office, the disclosure of which is incorporated herein by reference.

BACKGROUND OF THE INVENTION

1. Field of the Invention

The present invention relates to a display apparatus and a method for operating the same, and more particularly, to a display apparatus and a method for operating the same, which can use a privacy protection function in various efficient manners.

2. Description of the Related Art

Displays have been diversified in terms of types and functions.

Particularly a mobile terminal is a portable device equipped with one or more of a voice and video call function, an information input/output function, a data storing function, etc., while being carried with a user. Along with the diversification of its functions, the mobile terminal has evolved to an integrated multimedia player having complex functions such as picture-taking, video recording, playback of music files or video files, gaming, broadcasting reception, and wireless Internet.

To implement complex functions in such a mobile terminal developed as a multimedia player, new attempts have been taken in terms of hardware or software. For example, a User Interface (UI) environment is built to render search and selection of functions user-friendly.

As the mobile terminal has more and more functions, it processes significant information as in finance service and stores importable personal information about a user, as well. Accordingly, there exists an increasing need for protecting privacy.

SUMMARY OF THE INVENTION

Therefore, the present invention has been made in view of the above problems, and it is an object of the present invention to provide a display apparatus and a method for operating the same, which can increase user convenience.

It is another object of the present invention to provide a display apparatus and a method for operating the same, which can conveniently set a privacy protection function, particularly a lock function and use the privacy protection function in various efficient manners.

In accordance with an aspect of the present invention, the above and other objects can be accomplished by the provision of a method for operating a display apparatus, including acquiring biometric information about a user through a camera or a sensor unit, comparing the acquired biometric information with pre-stored authentication information, and switching the display apparatus to a first mode, if the acquired biometric information does not match with the pre-stored authentication information, the first mode restricting access to content predetermined from total content.

In accordance with another aspect of the present invention, there is provided a display apparatus including a sensor unit for acquiring biometric information about a user, a memory for storing authentication information for user authentication, and a controller for comparing the acquired biometric information with the stored authentication information, while screen locking is released. If the acquired biometric information does not match with the stored authentication information, the controller switches to a first mode that restricts access to content predetermined from total content.

BRIEF DESCRIPTION OF THE DRAWINGS

The above and other objects, features and other advantages of the present invention will be more clearly understood from the following detailed description taken in conjunction with the accompanying drawings, in which:

FIGS. 5 to 16D illustrate various embodiments of the methods for operating the display apparatus according to the present invention.

DETAILED DESCRIPTION OF THE PREFERRED EMBODIMENTS

Embodiments of the present invention will be described below with reference to the attached drawings.

A display apparatus as set forth herein is an electronic device equipped with a display and thus may be any of a TV, a mobile terminal, etc.

A mobile terminal as set forth herein may be any of a portable phone, a smart phone, a laptop computer, a digital broadcasting terminal, a Personal Digital Assistant (PDA), a Portable Multimedia Player (PMP), a camera, a navigator, a tablet computer, an e-book reader, etc.

The terms "module" and "unit" used to signify components are used herein to help the understanding of the components and thus they should not be considered as having specific meanings or roles. Accordingly, the terms "module" and "unit" may be used interchangeably.

The following description is given with the appreciation that a mobile terminal is being used as a display apparatus. However, embodiments of the present invention are not limited to the mobile terminal and are application to other display apparatuses.

Figure 1:
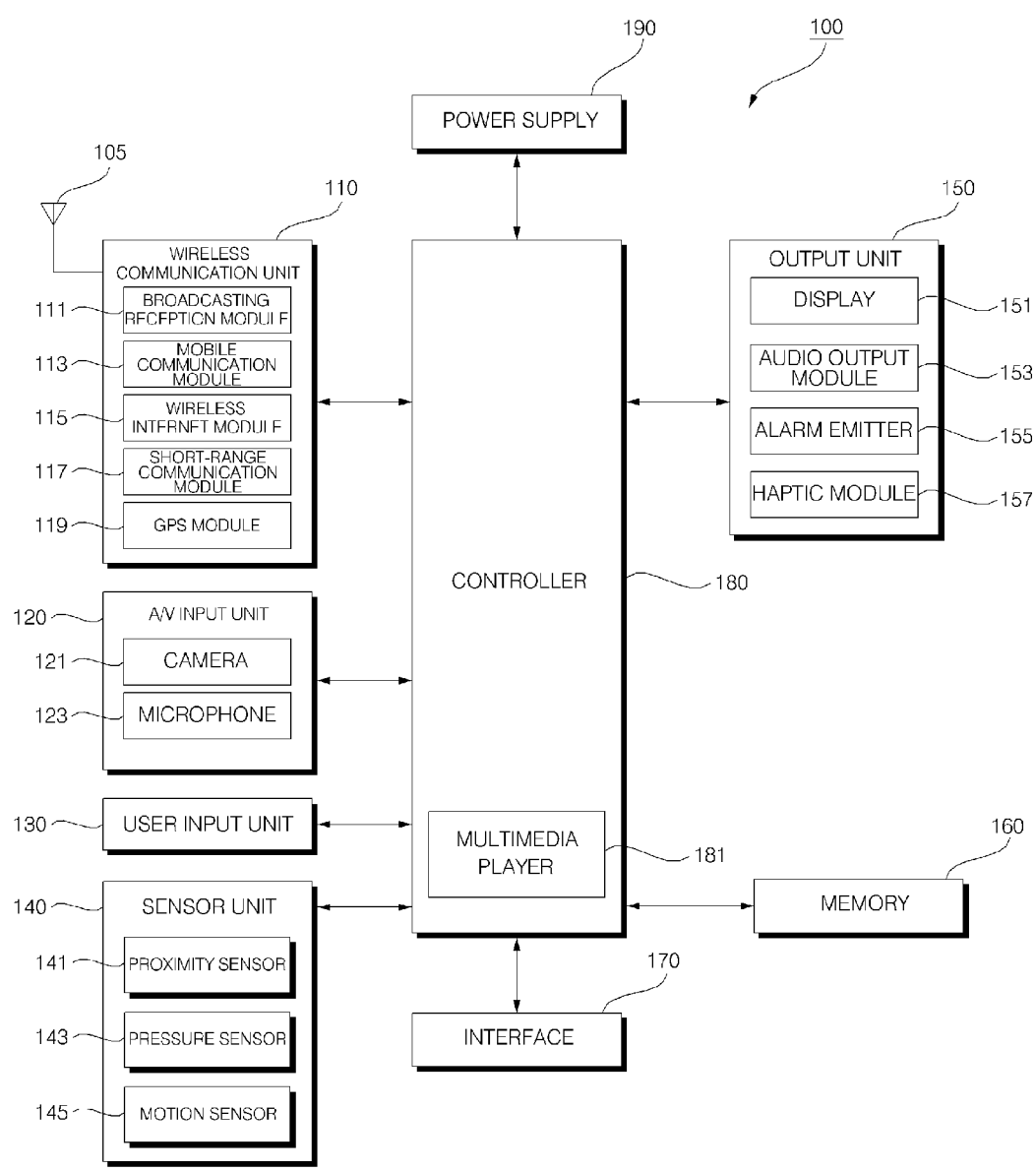
FIG. 1 is a block diagram of a display apparatus according to an embodiment of the present invention.

FIG. 1 is a block diagram of a display apparatus, particularly a mobile terminal according to an embodiment of the present invention. With reference to FIG. 1, functional components the mobile terminal will be described below.

Referring to FIG. 1, a mobile terminal 100 may include a wireless communication module 110, an Audio/Video (A/V) input unit 120, a user input unit 130, a sensor unit 140, an output unit 150, a memory 160, an interface 170, a controller 180, and a power supply 190. Two or more components of the mobile terminal 100 may be combined into a single component or a single component thereof may be separated into two or more components in alternative embodiments.

The wireless communication module 110 may include a broadcasting reception module 111, a mobile communication module 113, a wireless Internet module 115, a short-range communication module 117, and a Global Positioning System (GPS) module 119.

The broadcasting reception module 111 receives at least one of a broadcast signal or broadcasting-related information on a broadcast channel from an external broadcasting management server. The broadcast channel may be any of a satellite channel, a terrestrial channel, etc. The broadcasting management server may refer to a server for generating and transmitting at least one of a broadcast signal or broadcasting-related information or a server for receiving at least one of an already generated broadcast signal or already generated broadcasting-related information and providing the received at least one of the broadcast signal or the broadcasting-related information to terminals.

The broadcast signal may be a TV broadcast signal, a radio broadcast signal, a data broadcast signal, or a combination of the TV broadcast signal and the data broadcast signal or the radio broadcast signal and the data broadcast signal. The broadcasting-related information may be information related to a broadcast channel, a broadcast program, or a broadcast service provider. The broadcasting-related information may be provided over a mobile communication network. In this case, the mobile communication module 113 may receive the broadcasting-related information. The broadcasting-related information may take various forms.

The broadcasting reception module 111 may receive a broadcast signal through a broadcasting system, particularly a digital broadcast signal through a digital broadcasting system such as DMB-Terrestrial (DMB-T), DMB-Satellite (DMB-S), Media Forward Link Only (MediaFLO), DVB-H, or Integrated Services Digital Broadcast-Terrestrial (ISDB-T). The broadcasting reception module 111 may be adapted to all other broadcasting systems that provide broadcast signals as well as the digital broadcasting system. The broadcast signal and/or broadcasting-related information received at the broadcasting reception module 111 may be stored in the memory 160.

The mobile communication module 113 transmits and receives a radio signal to and from at least one of a Base Station (BS), an external terminal, or a server over a mobile communication network. The radio signal may include a voice call signal, a video call signal, or text/other various types of data involved in multimedia message transmission and reception.

The wireless Internet module 115 is a built-in or external module for providing wireless Internet connectivity to the mobile terminal 100. The wireless Internet module 115 may operate in conformance to Wireless Local Area Network (WLAN) (Wireless Fidelity (WiFi)), Wireless broadband (Wibro), World Interoperability for Microwave Access (Wi-MAX), High Speed Downlink Packet Access (HSDPA), etc.

The short-range communication module 117 is used for short-range communication. For short-range communication, the short-range communication module 117 may conform to Bluetooth, Radio Frequency Identification (RFID), Infrared Data Association (IrDA), Ultra WideBand (UWB), ZigBee, Near Field Communication (NFC), etc.

The GPS module 119 receives location information from a plurality of GPS satellites.

The A/V input unit 120 is used to receive an audio signal or a video signal and may include a camera 121 and a microphone 123. The camera 121 processes video frames of still images or a video acquired from an image sensor in video call mode or camera mode. The processed video frames may be displayed on a display 151.

The video frames processed by the camera 121 may be stored in the memory 160 or transmitted externally through the wireless communication module 110. Two or more cameras 121 may be provided to the mobile terminal 100 depending on the configuration specification of the mobile terminal 100.

The microphone 123 receives an external audio signal and processes the audio signal to electrical voice data in call mode, recording mode, or voice recognition mode. In the call mode, the processed voice data may be converted to a format transmittable to a BS and output through the mobile communication module 113. Various noise cancellation algorithms are available to the microphone 123 in order to eliminate noise which is introduced during input of an external audio signal.

The user input unit 130 generates key input data that the user inputs to control the operation of the mobile terminal 100. The user input unit 130 may include a keypad, a dome switch, a (resistive/capacitive) touch pad, etc. to receive a command or information through the user's push or touch manipulation. The user input unit 130 may be configured to operate in a jog wheel or jog fashion involving key rotation, in a joy stick fashion, or in a finger mouse fashion. Especially when a touch pad is layered with the display 151, the resulting structure may be referred to as a touch screen.

The sensor unit 140 senses the current state of the mobile terminal 100, such as the open or closed state, position, or user touch of the mobile terminal 100 and generates a sensing signal to control the operation of the mobile terminal 100 according to the sensed state. For example, if the mobile terminal 100 is a sliding phone, the sensor unit 140 may sense whether the sliding phone is opened or closed. In addition, the sensor unit 140 may sense whether the power supply 190 is supplying power or whether the interface 170 is coupled with an external device.

The sensor unit 140 may include a proximity sensor 141, a pressure sensor 143, and a motion sensor 145. The proximity sensor 141 may detect an object approaching the mobile terminal 100 or the existence or absence of an object in the vicinity of the mobile terminal 100 without mechanical contact. The proximity sensor 141 may detect a nearby object based on a change in an alternating or static magnetic field or the variation rate of capacitance. In addition, the proximity sensor 141 may sense a surface of the mobile terminal 100 that the user grabs. One or more proximity sensors 141 may be provided to the mobile terminal 100 depending on the specification of the mobile terminal 100.

The pressure sensor 143 may determine whether pressure is applied to the mobile terminal 100 and how strong the pressure is. The pressure sensor 143 may be installed at a part of the mobile terminal 100 requiring pressure detection according to the environment in which the mobile terminal 100 is used.

If the pressure sensor 143 is installed on the display 151, a touch input on the display 151 may be identified from a pressed touch input on the display 151, for which a stronger pressure is applied than for the touch input, according to a signal output from the pressure sensor 143. In addition, in case of the pressed touch input, the magnitude of pressure applied to the display 151 may also be known from the signal output from the pressure sensor 143.

If the pressure sensor 143 is disposed at an edge of the mobile terminal 100, it may sense which surface of the mobile terminal 100 the user is grabbing by detecting pressure.

The motion sensor 145 senses the position or motion of the mobile terminal 100 using an acceleration sensor, a gyro sensor, etc. The acceleration sensor is a device that converts an acceleration change in a direction to an electrical signal. Along with the development of the Micro-ElectroMechanical System (MEMS) technology, acceleration sensors have become popular.

There are a broad range of acceleration sensors from an acceleration sensor that measures a large acceleration value for sensing collision in an airbag system for a vehicle to an acceleration sensor that measures a very small acceleration value for use as an input means capable of fine hands' motions when a game is played. Typically, 2- or 3-axis acceleration sensors are packed into one package or a single z-axis acceleration sensor is used depending on use environments. Accordingly, when not a Z-axis acceleration sensor but an X-axis or Y-axis acceleration sensor is to be used, the acceleration sensor may be erected on a main substrate by means of a substrate fragment.

The gyro sensor measures an angular velocity and thus senses a rotated direction with respect to a reference direction.

The sensor unit 140 may include sensors for user authentication. For example, when a user is authenticated based on the user's biometric information, the sensor unit 140 may include a sensor for recognizing body temperature, fingerprints, an iris pattern, a face, etc. Depending on a user authentication method set for the mobile terminal 100, the sensor unit 140 may include a necessary sensor.

The output unit 150 outputs an audio signal, a video signal, or an alarm signal. The output unit 150 may include the display 151, an audio output module 153, an alarm emitter 155, and a haptic module 157.

The display 151 displays information processed in the mobile terminal 100. For example, when the mobile terminal 10 is in the call mode, the display 151 displays a UI or Graphical User Interface (GUI) related to a call. In the video call mode or the camera mode, the display 151 may display captured or received images separately or simultaneously and may also display a UI or GUI.

As described before, if a touch screen is configured by layering the display 151 with a touch pad, the display 151 may be used not only as an output device but also as an input device capable of receiving information by a user's touch.

If the display 151 is configured into a touch screen, it may include a touch screen panel, a touch screen panel controller, etc. In this case, the touch screen panel, which is a transparent panel attached on the exterior of the touch screen, may be connected to an internal bus of the mobile terminal 100. The touch screen panel keeps monitoring whether it is touched by a user. Upon detection of a touch input, the touch screen panel provides a signal corresponding to the touch input to the touch screen panel controller. The touch screen panel controller processes the received signal into data and transmits the data to the controller 180 so that the controller 180 may determine the presence or absence of a touch input and may locate a touched spot on the touch screen.

The display 151 may be configured into electronic paper (e-paper). E-paper is a kind of reflective display having excellent visual characteristics including a high resolution, a wide viewing angle, and a bright white background, like paper and ink. The e-paper may be formed on any substrate of a material such as plastic, metal, paper, etc. Since the e-paper can keep an image after power is off and does not require a backlight assembly, it lengthens the battery lifetime of the mobile terminal 10. The display 151 may be configured into e-paper using electrostatic-charged hemispherical twist balls, electrophoretic deposition, or microcapsules.

Besides, the display 151 may be configured into at least one of a Liquid Crystal Display (LCD), a thin film transistor-LCD, an Organic Light Emitting Diode (OLED) display, a flexible display, and a 3D display. Depending on implementation of the mobile terminal 100, the mobile terminal 100 may be provided with two or more displays 151. For example, both external and internal displays (not shown) may be mounted to the mobile terminal 100.

The audio output unit 153 outputs audio data received from the wireless communication module 110 or stored in the memory 160 in call termination mode, call mode, recording mode, voice recognition mode, or broadcast reception mode. The audio output module 153 also outputs an audio signal involved in a function performed by the mobile terminal 100, for example, an audio signal related to a call incoming sound, a message reception sound, etc. The audio output module 153 may include a speaker, a buzzer, etc.

The alarm emitter 155 outputs a signal notifying occurrence of an event to the mobile terminal 100. Events of the mobile terminal 100 include call signal reception, message reception, key signal input, etc. The alarm emitter 155 may output an event notification signal in a form other than an audio signal or a video signal. For example, the event notification signal may be output in the form of vibrations. Upon receipt of a call signal or a message, the alarm unit 155 may output a signal notifying the call signal or message reception. Upon receipt of a key signal, the alarm unit 155 may output a feedback signal for the key signal input. Thus, the user is aware of occurrence of an event from a signal output from the alarm unit 155. A signal notifying of occurrence of an event may also be output through the display 151 or the audio output module 153 in the mobile terminal 100.

The haptic module 157 generates various tactile effects that a user can feel. A major example of the tactile effects is vibrations. When the haptic module 157 generates vibrations as tactile effects, the intensity and pattern of the vibrations may be altered. The haptic module 157 may synthesize different vibration effects and output the synthesized vibration effects. Alternatively, the haptic module 157 may output different vibration effects sequentially.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store programs required for processing and controlling in the controller 180 or temporarily store input or output data (e.g. a phone book, still images, videos, etc.).

The memory 160 may include at least one of a flash memory type storage medium, a hard disk type storage medium, a multimedia card micro type storage medium, a card type memory (e.g., a Secure Digital (SD) or eXtreme Digital (XD) memory), a Random Access Memory (RAM), and a Read-Only Memory (ROM). The mobile terminal 10 may operate a web storage, which performs the storage function of the memory 160 on the Internet.

The interface 170 interfaces between the mobile terminal 100 and all external devices connected to the mobile terminal 100. The external devices may include a wired/wireless headset, an external charger, a wired/wireless data port, a memory card, a card socket such as a Subscriber Identification Module (SIM) card or a User Identity Module (UIM) card, an audio Input/Output (I/O) port, a video I/O port, an earphone, etc. The interface 170 may receive data or power from such an external device and transfer the data or power to each component of the mobile terminal 10. In addition, the interface 170 may transmit data from the mobile terminal 100 to the external device.

When the mobile terminal 100 is connected to an external cradle, the interface 170 may provide a path for supplying power from the external cradle to the mobile terminal 100 or for transmitting various user-input command signals from the external cradle to the mobile terminal 100.

The controller 180 typically provides overall control to the mobile terminal 10 by controlling the operation of each component. For example, the controller 180 controls and processes voice call, data communication, video call, etc. The controller 180 may include a multimedia play module 181 for playing multimedia. The multimedia play module 181 may be configured in hardware inside the controller 180 or in software separately from the controller 180.

The power supply 190 may receive power from an external power source or an internal power source and supply power to the other components of the mobile terminal 100.

The mobile terminal 100 having the above-described configuration may be configured to operate in communication systems capable of transmitting data in frames or packets, including a wired/wireless communication system or a satellite communication system.

Figure 2:
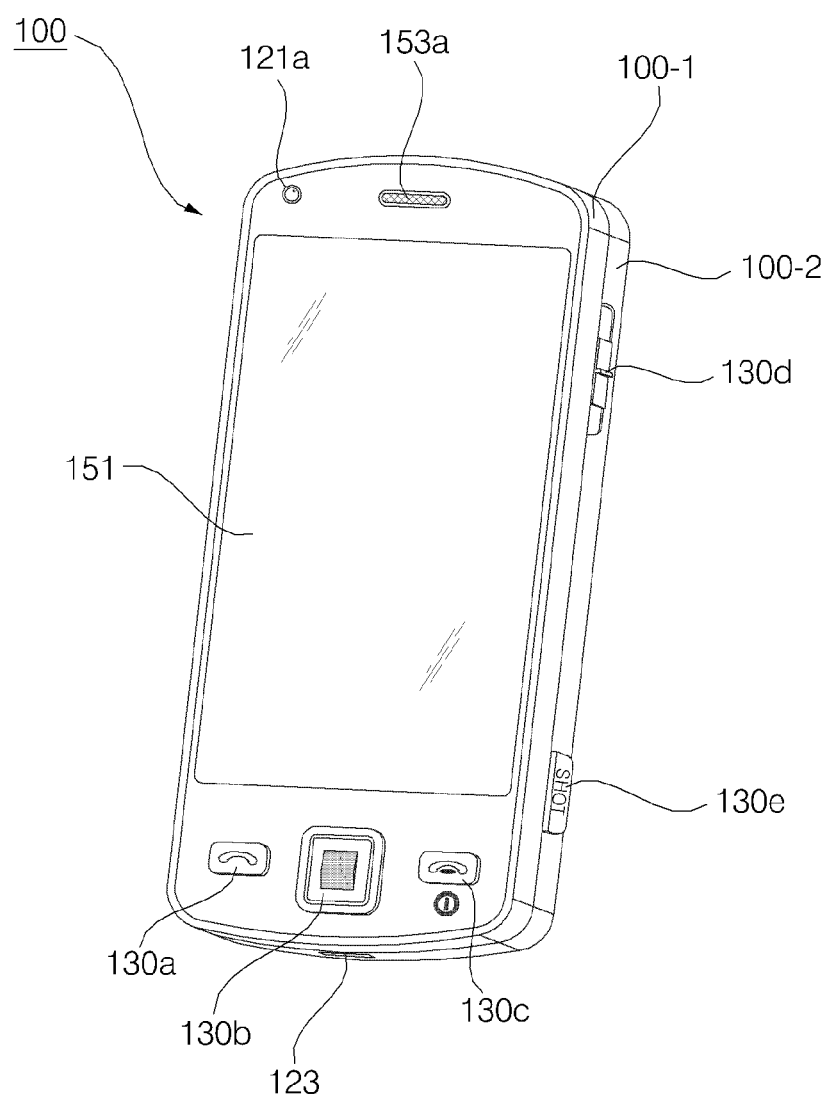
FIG. 2 is a front perspective view of a mobile terminal according to an embodiment of the present invention.
Figure 3:
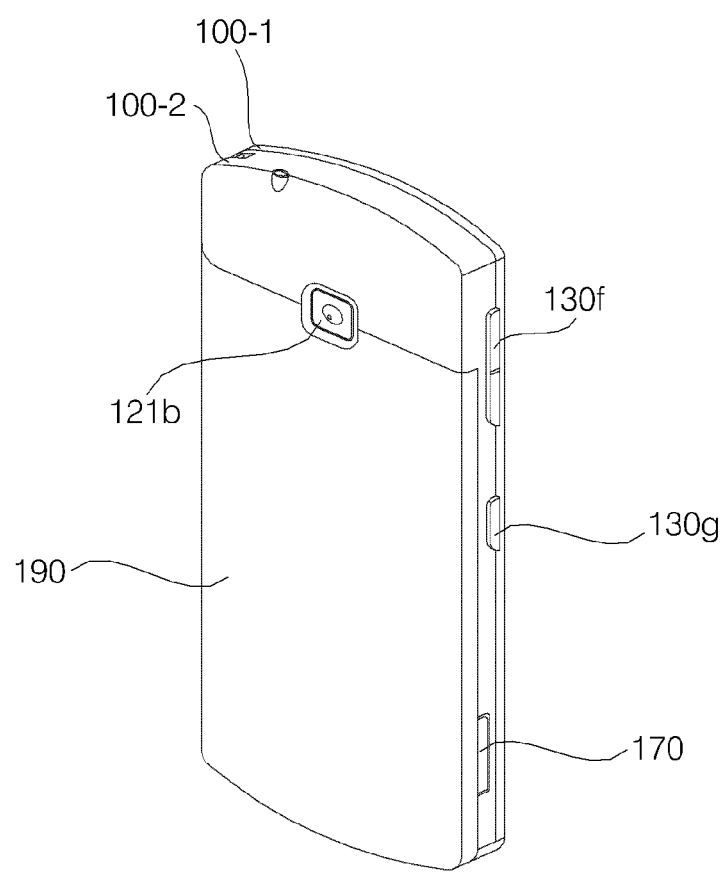
FIG. 3 is a rear perspective view of the mobile according to an embodiment of the present invention.

FIG. 2 is a front perspective view of the mobile terminal according to an embodiment of the present invention and FIG. 3 is a rear perspective view of the mobile terminal illustrated in FIG. 2. With reference to FIGS. 2 and 3, the exterior of the mobile terminal will be described, centering on its components. While the following description is given in the context of a bar-type mobile terminal having a front touch screen, it is purely exemplary. Thus it is to be understood that the present invention is also applicable to other types of mobile terminals including a folder type, a swing type, and a slider type.

Referring to FIG. 2, a front case 100-1 and a rear case 100-2 form the exterior of the mobile terminal 100. Various electronic parts are enclosed in the space formed by the front case 100-1 and the rear case 100-2.

The display 151, a first audio output module 153a, a first camera 121a, and first through third user input modules 130a through 130c may be disposed in a main body of the mobile terminal 100, particularly on the front case 100-1. Fourth and fifth user input modules 130d and 130e and the microphone 123 may be disposed on side surfaces of the rear case 100-2.

If a touch pad is layered with the display 151, the display 151 may serve as a touch screen so that the user can enter various types of information to the mobile terminal 100 simply by touching the display 151.

The first audio output module 153a may be implemented as a receiver or a speaker. The first camera 121a may be configured to be suitable for capturing a still image or video of the user. The microphone 123 may be adapted to properly receive the user's voice or other sounds.

The first through fifth user input modules 130a through 130e and sixth and seventh user input modules 130f and 130g may be collectively referred to as the user input unit 130, and any means can be employed as the first through seventh user input modules 130a through 130f so long as it can operate in a tactile manner.

For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130a through 130c may operate as function keys for entering a command such as start, end, or scroll, the fourth user input module 130d may operate as a function key for selecting an operating mode for the mobile terminal 100, and the fifth user input module 130e may operate as a hot key for activating a special function within the mobile terminal 100.

Referring to FIG. 3, a second camera 121b may be additionally provided on the rear surface of the rear case 100-2, and the sixth and seventh user input modules 130f and 130g and the interface 170 may be disposed on one side surface of the rear case 100-2.

The second camera 121b may have a shot direction which is substantially the opposite to that of the first camera 121a, and may have a different resolution from that of the first camera 121a. A flash (not shown) and a mirror (not shown) may be disposed in the vicinity of the second camera 121b. To capture a 3D image, a third camera may further be installed near to the second camera 121b.

When an image of an object is captured with the second camera 121b, the flash may illuminate the object. The mirror may allow the user to see himself or herself when he or she wants to capture his or her own image (self-portrait taking) by using the second camera 121b.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface 170 may be used as a passage allowing the mobile terminal 10 to exchange data with an external device. A broadcast signal reception antenna (not shown) may be disposed at one side of the front or rear case 100-1 or 100-2, in addition to an antenna used for calls. The broadcast signal reception antenna may be installed such that it can be extended from the rear case 100-2.

The power supply 190 may be mounted on the rear case 100-2 to supply power to the mobile terminal 10. The power supply 190 may be, for example, a chargeable battery which can be detachably mounted to the rear case 100-2 for being charged.

While the second camera 121b has been described as being provided on the rear case 100-2, this does not limit the scope of the present invention. Without the second camera 121b, the first camera 121a may be configured to be rotatable and thus to capture an image even in the shot direction of the second camera 121b.

Figure 4:
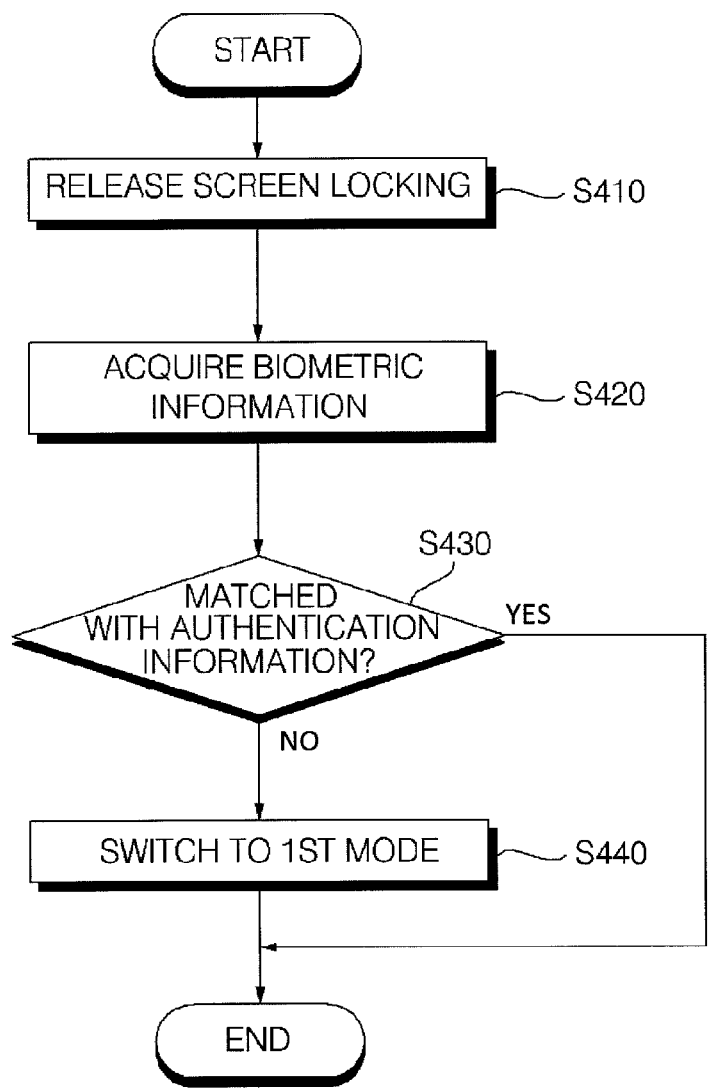
FIG. 4 is a flowchart illustrating a method for operating the display apparatus according to an embodiment of the present invention.

FIG. 4 is a flowchart illustrating a method for operating the display apparatus according to an embodiment of the present invention, and FIGS. 5 to 16D illustrate various embodiments of the method for operating the display apparatus according to the present invention.

Referring to FIG. 4, the following description is centered on a mobile terminal. The mobile terminal 100 unlocks its screen and switches to an active state (S410).

The term 'locked state' refers to a state in which a specific part of the mobile terminal 100 is not accessible due to restriction on access to the specific part and access to a specific operation or service is restricted. For example, a user's access to specific data such as a video, pictures, personal information, a directory, etc. may be restricted and execution of a specific operation or service may be restricted in the locked state.

If the controller 180 has not received a touch input or a key input for a predetermined time or upon receipt of a lock command from the user, the controller 180 switches the operation mode of the mobile terminal 100 to a protection state or the locked state in which no operation is performed in response to a touch input or a general key input.

Figure 5:
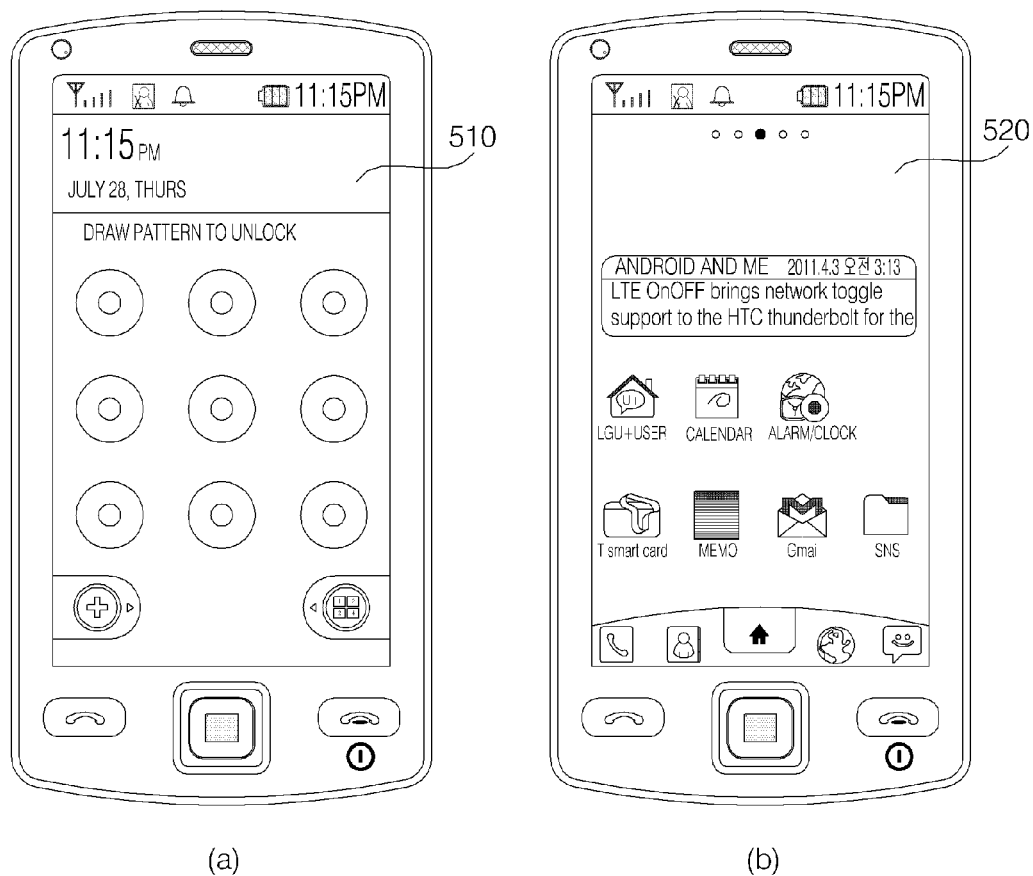

If the user shakes the mobile terminal 100 or presses a predetermined key button after leaving the mobile terminal 100 unused for a predetermined time, an authentication screen 510 is displayed on the display 151, for user authentication, as illustrated in FIG. 5(*a*).

Use of most or all of content may be comprehensively restricted until before valid user authentication. This state may be referred to as a screen locked state.

Herein, the term 'content' generically refers to various information or its contents that are formed, processed, and distributed digitally, inclusive of text, signs and symbols, voice, sounds, images, pictures, etc. 'Content' covers a broad range of information such as programs and services available from the mobile terminal 100 including games, applications, call service, finance service, etc. as well as pictures, videos, and text.

Upon receipt of an unlock command requesting release of access restriction through a predetermined authentication procedure such as entering a password, the controller 180 may release the locked state and switches to the active state free of access restriction.

As illustrated in FIG. 5(*a*), user authentication may be performed by inputting a predetermined pattern corresponding to the unlock command or entering a password. Many other user authentication schemes are available.

If a registered unlock command has not been input, the authentication screen 510 may be kept unchanged or a message indicating authentication failure may be displayed on the display 151.

On the contrary, if the user inputs a registered unlock command, the screen locking is released and a preset screen 520 is displayed as illustrated in FIG. 5(*b*). Thus the user can access all content of the mobile terminal 100.

Therefore, in case the mobile terminal 100 is lost or stolen, when an unauthorized person is to use the mobile terminal 100, the unauthorized person is prompted to input the unlock command so that the user's privacy and information may be protected to a certain degree.

In accordance with an embodiment of the present invention, upon sensing movement of the mobile terminal 100 or sensing a user through the camera 121, the user's face may be recognized and if the recognized user's face matches with pre-stored user's facial information, the screen locking may be released without requesting additional input of a password.

On the other hand, if the recognized face does not match with the registered user's facial information, the authentication screen 510 may be kept still or a message indicating authentication failure may be displayed on the display 151.

However, once the screen locking is released in the conventional methods for unlocking a screen after user authentication as illustrated in FIG. 5(*b*), the screen is kept unlocked until the user turns off the screen or leaves the mobile terminal 100 unused for a specific time. As a result, the mobile terminal 100 is vulnerable to privacy breach.

For example, when the user is engaged with another task or moves to somewhere else, leaving the mobile terminal 100 behind, an unauthorized person may turn off the screen locking setting or freely change an unlock command such as a password as well as access all content available in the mobile terminal 100.

Figure 6:
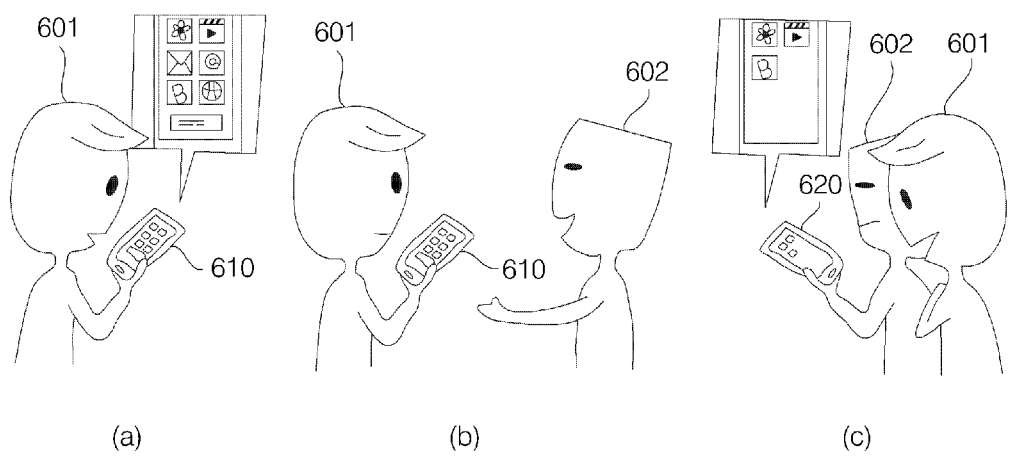

As illustrated in FIG. 6, with the mobile terminal 100 released from the locked state by a registered user 601, if the user 601 shares the mobile terminal 100 with an unauthorized person 602 or allow the unauthorized person 602 to use the mobile terminal 100, unintended content is likely to be disclosed to the unauthorized person 602.

Accordingly, the present invention is intended to provide a more convenient, reinforced privacy protection function.

Embodiments of the present invention are more effective, particularly when a mobile terminal is released from a general locked state. A user allows access to whole content and functions by unlocking his or her mobile terminal after user authentication. Then the user may partially lock or unlock the mobile terminal adaptively to circumstances, rather than fully lock the mobile terminal. According to the present invention, the typical lock function may be referred to as an initial locking setting and a partial lock function may be provided to a user even after the initial locking is released.

In addition, the present invention can eliminate or minimize repeated user authentication inputs and restricts access to specific content and functions depending on whether a user is authorized or not. Therefore, fast execution is possible and user privacy is more effectively protected.

In accordance with the embodiment of the present invention, the mobile terminal 100 may acquire biometric information about the user through a sensor module (not shown) (S420). For example, the sensor module (not shown) may be configured so as to include the camera 121 and/or the sensor unit 140 and may acquire biometric information through the camera 121 and/or the sensor unit 140.

The biometric information may include information about at least one of a face, fingerprint, iris pattern, corneal pattern, or body temperature. Each person differs in biometric information such as a face, an iris pattern, a corneal pattern, a palm print, a vein pattern, etc. and thus an individual can be identified by his or her biometric information.

Because humans have their unique biometric features including faces, iris patterns at the outer boundaries of pupils, corneal patterns, palm patterns, etc., an image of a pattern in question may be captured through a camera and identified. A unique vein pattern may also be identified by illuminating veins with infrared rays.

If the user's biometric information is preliminarily registered and then used as authentication information without the need for an additional password, security can be reinforced.

The sensor module (not shown) may include the camera 121 for capturing an image of at least one of a face, a fingerprint, an iris, or a cornea. As the camera 121 is generally provided in the mobile terminal 100, an additional sensor is advantageously not needed.

Or the sensor module may include the sensor unit 140 for sensing at least one of a fingerprint, an iris, a cornea, or body temperature. An additional sensor for acquiring biometric information needed for user authentication may be mounted inside the sensor unit 140 or separately from the sensor unit 140.

For example, a fingerprint sensor may be disposed at an edge of a case of the mobile terminal 100 so that it acquires fingerprint information from the user's grip of the mobile terminal 100, for user authentication.

In some embodiments of the present invention, the display 151 may scan a touching object, for example, a finger's tip. When a finger is scanned at the moment of a finger's touch, fingerprint information may be acquired.

The sensor module may include the camera 121, the sensor 140, and other dedicated sensors in combination.

The controller 180 may determine whether the user has been registered by comparing the acquired biometric information with authentication information pre-stored in the memory 160 (S430).

Regarding use of facial information as the biometric information, a facial image captured by the camera 121 is compared with facial images pre-stored in the memory 160 by a face recognition technique. Various known face recognition techniques are available.

For example, feature points such as relative distances among the eyes, the nose, and the mouth, a facial contour, the distance between the inner ends of the eyes, the distance between the outer ends of the eyes, and the lengths of the nose and mouth may be extracted and compared with the user's facial feature points registered for screen unlocking.

Regarding use of fingerprint information as the biometric information, a fingerprint is composed of ridges protruding from a skin surface and valleys being spaces between the ridges. Since every individual has a different ridge and valley pattern, users can be identified by fingerprint recognition, relying on the uniqueness and difference of the users' ridge and valley patterns. More specifically, a fingerprint is recognized by means of a fingerprint sensor that senses ridges in a fingerprint and converts the sensed ridge information to 2D image data or by means of a screen that scans a touched area.

The present invention is not limited to any specific fingerprint recognition technique and thus various fingerprint recognition techniques are available herein. Fingerprint information may be acquired in various manners including an optical, capacitive, or electrical conductive semiconductor technique, an ultrasound technique, a heat sensing technique, a non-contact technique, or a combination of them.

For example, a fingerprint may be input in an optical fashion or semiconductor fashion. In the former scheme, the fingerprint pattern of a fingertip placed on a platen is reflected by illuminating strong light onto the platen and the reflected fingerprint pattern passes through a high-index lens and is input to a Charge-Coupled Device (CCD) capable of converting light to electricity and thus reading an input. In the latter scheme, when a fingertip is brought into direct contact with the surface of a silicon chip, a special pattern of the fingerprint on the chip surface is read as an electrical signal based on the electric conductivity of the skin.

On the other hand, if the acquired biometric information does not match with any of the pre-stored authentication information or upon sensing biometric information different from the pre-stored authentication information, the controller 180 may control switching of the mobile terminal 100 to a first mode that restricts access to predetermined content among all content (S440).

Considering that the first mode restricts access to content for which the user has additionally set partial locking among total content accessible by releasing screen locking, the first mode may be referred to as partial locking mode.

The first mode is characterized in that it switches the predetermined content to a hidden or locked state.

In the first mode, content set to the hidden state is not displayed on the display 151 and content set to the locked state is accessible after additional authentication such as inputting a password. In this manner, access to specific content is restricted in the first mode.

When the registered user 601 allows the unauthorized person 602 to use the mobile terminal 100 as illustrated in FIG. 6(b) with a screen 610 unlocked through face recognition of the user 601 displayed on the display 151 as illustrated in FIG. 6(a), the camera 121 may not capture a facial image of the user 601 or may capture a facial image of the unauthorized person 602.

Therefore, the controller 180 automatically switches the mobile terminal 100 to the first mode and thus the unauthorized person 602 views the screen 620 in which specific content is hidden or locked for access restriction.

In this manner, the user 601 prevents the unauthorized person 602 from viewing or using some content without an additional manipulation. Consequently, privacy protection is enhanced.

According to embodiments of the present invention, a double locking setting is available.

That is, even though the mobile terminal is released from the general lock function, the mobile terminal may be partially locked and unlocked adaptively according to use circumstances.

For example, in many cases where the user allows another person to use the mobile terminal, leaves the mobile terminal behind in an open place such as on a table, or uses the mobile terminal with many people around the user, as illustrated in FIG. 6, the user may set the partial lock function for the mobile terminal and release the partial locking of the mobile terminal only when the user is sensed.

As the user 601 does not take an additional visible action to set partial locking, the user's privacy is protected without hurting the feeling of the unauthorized user 602.

In accordance with an embodiment of the present invention, the mobile terminal 100 automatically distinguishes a registered user from an unregistered user to thereby automatically protect or synchronize the user's content.

For example, when the user views a screen of the mobile terminal 100, the user's face is recognized. If the recognized user's face turns out valid, even the partial lock function is released and thus all content is accessible to the user. However, if the registered user is not sensed, the content is locked or hidden from other persons in the partial locking mode.

In the case where a fingerprint recognition technique is used for user authentication, the user preliminarily registers his or her fingerprint, for example, the fingerprint of the right index finger for authentication. Thus each time the user touches specific content, the mobile terminal 100 may recognize the user by comparing the recognized fingerprint of the user with pre-registered fingerprints.

For example, if someone touches a gallery icon, the gallery is open if the registered user's fingerprint is recognized. On the contrary, if any other fingerprint is recognized or the registered fingerprint is not recognized, the galley is not open.

Consequently, when the user lends the mobile terminal 100 to another person, wanting not to show photos in a gallery, the user can protect the photos without taking any additional action.

Conventionally, the user should enter a password to unlock a locked icon or view a hidden icon, although inconveniently. However, the present invention can identify the authorized user automatically by fingerprint recognition and thus unlock or show the locked or hidden content.

Meanwhile, if the acquired biometric information matches with any of the pre-stored authentication information, the mobile terminal 100 operates in a second mode that allows access to the total content, that is, in authentication mode.

Meanwhile, the present invention is also applicable to electronic devices other than the mobile terminal 100.

For example, when the user views TV alone, the mobile terminal 100 may recognize the user automatically without an additional setting after face recognition and thus may provide a customized service to the user by synchronizing Social Networking Service (SNS), photos, and bookmark information of the user. However, if the registered user disappears from the shot range of the camera or any other person is sensed, the mobile terminal 100 may hide the customized service.

The first mode is characterized in that a notification message related to hidden-state content is not output.

For example, if a hiding setting has been applied to an SNS application, even though the controller 180 receives a specific SNS message, it controls the display 151 not to display the received message or a related notification message and controls the audio output module 153 not to emit a reception notification sound.

Meanwhile, the method for operating the mobile terminal according to the embodiment of the present invention may further include sensing a grip or movement of the mobile terminal 100 and activating a biometric recognition function.

Activation of the biometric recognition function means activating a component used to implement a specific biometric recognition technique. For example, when a face recognition technique is adopted, the camera 121 may be activated. In the case of a vein pattern recognition technique, the sensor unit 140 may be activated.

A user's grip or non-grip may be sensed by disposing the proximity sensor 141 or the pressure sensor 143 on a side surface of the mobile terminal 100. Or to determine a surface of the mobile terminal 100 gripped by the user, proximity sensors 141 or pressure sensors 143 may be disposed on the four up, down, left and right side surfaces of the mobile terminal 100. In addition, the motion sensor 145 of the mobile terminal 100 may sense movement of the mobile terminal 100.

Referring to FIGS. 7A to 7F, with a specific image 710 displayed, the motion sensor 145 may sense a user's gesture of holding the mobile terminal 100.

If the mobile terminal 100 is configured to authenticate the user by face recognition, the mobile terminal 100 may recognize the user's gesture of holding the mobile terminal 100 toward the user's face and activate a face recognition function automatically.

The controller 180 automatically activates the face recognition function and acquires a facial image 701 of the user by driving the camera 121. In this case, the controller 180 may display the acquired facial image 701 or an icon or message indicating face recognition in progress on the display 151.

If the mobile terminal 100 identifies the registered user as a result of the face recognition, the mobile terminal 100 may operate automatically in the state where none of content is restricted for access and hidden, that is, in the second mode where all content is accessible. If the mobile terminal 100 fails to identify the registered user, the mobile terminal 100 may operate in the first mode.

Figure 7A:
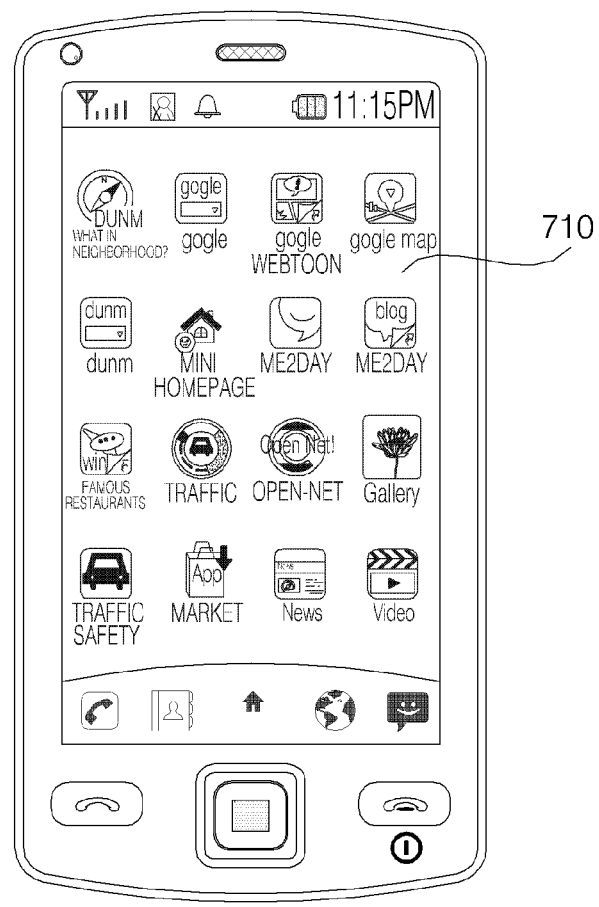
Figure 7B:
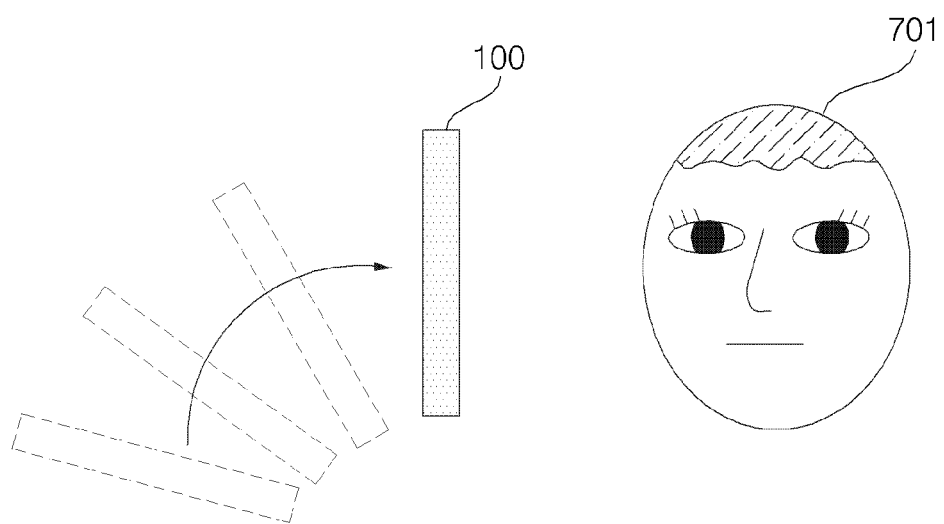
Figure 7C:
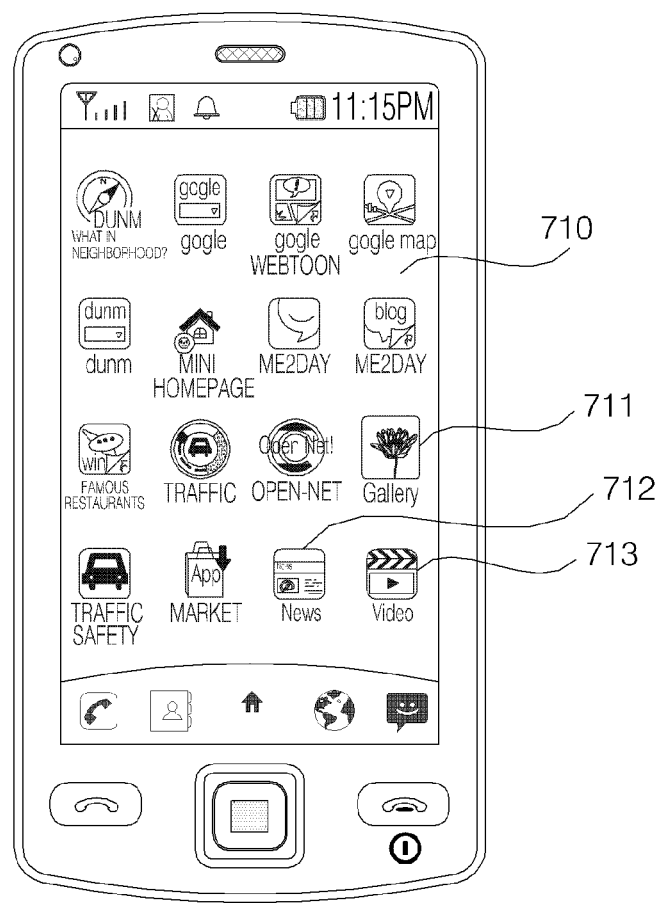
Figure 7D:
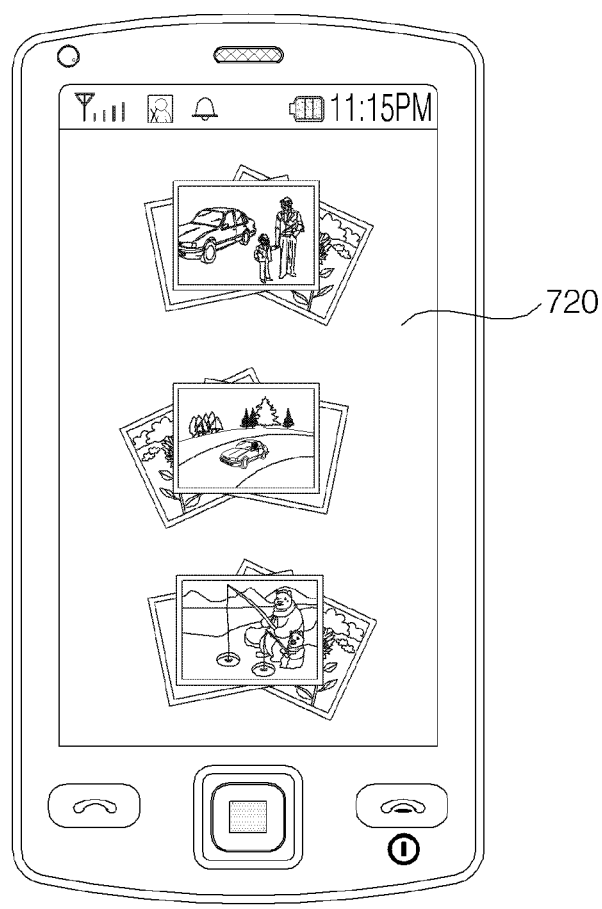
Figure 7E:
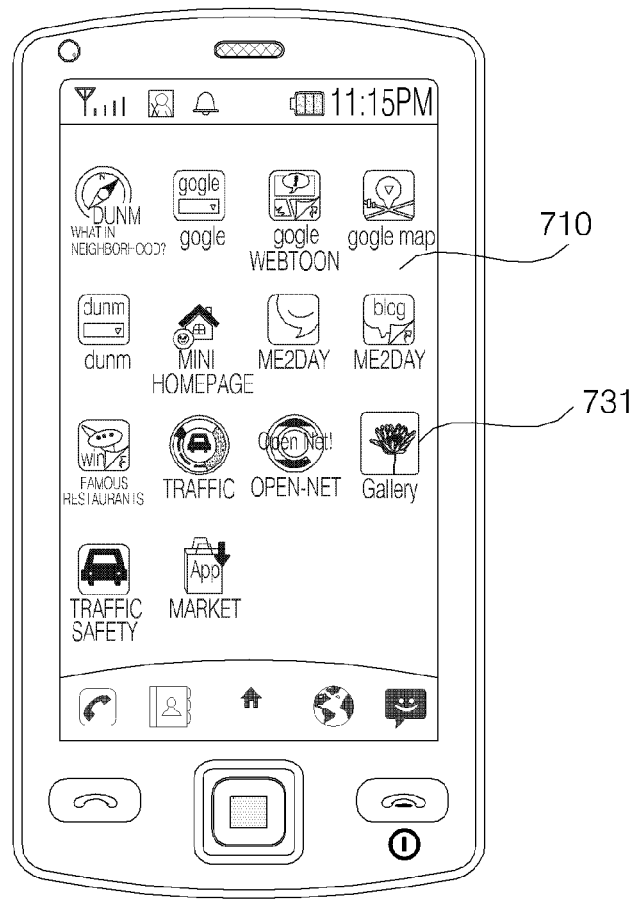

FIG. 7C illustrates an exemplary screen 710 displayed in the second mode and FIG. 7E illustrates an exemplary screen 730 displayed in the first mode. From a comparison between FIGS. 7C and 7E, it is noted that applications 712 and 713 to which an automatic hiding setting has been applied are displayed in the second mode but not displayed in the first mode.

Upon selection of an application 711 to which a locking setting has been applied in the second mode, internal content or an executed application 720 is accessible without entering a password, as illustrated in FIG. 7D.

On the contrary, upon selection of the locking-set application 711 in the first mode, the content is not directly accessible. Only when an additional authentication is performed, the content can be accessed.

Figure 7F:
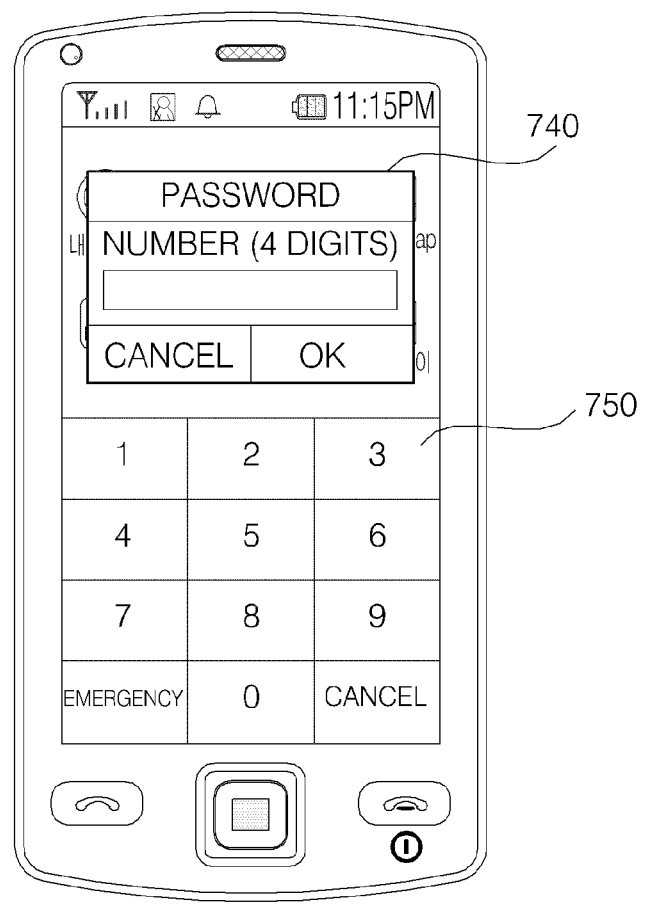

For example, a password input window 740 and a screen keyboard 750 may be displayed, as illustrated in FIG. 7F.

Meanwhile, automatic locking may be released by an eye (iris or cornea) recognition technique.

Figure 8:
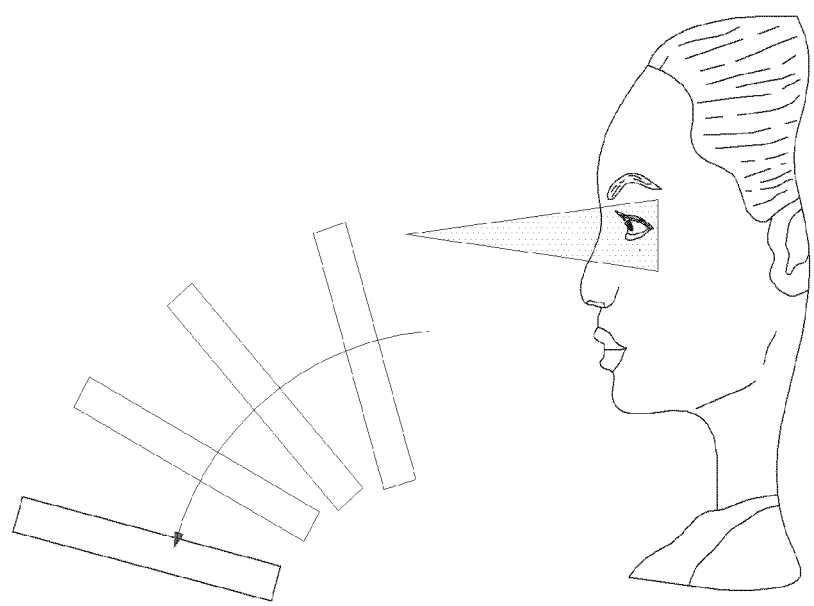
Figure 10:
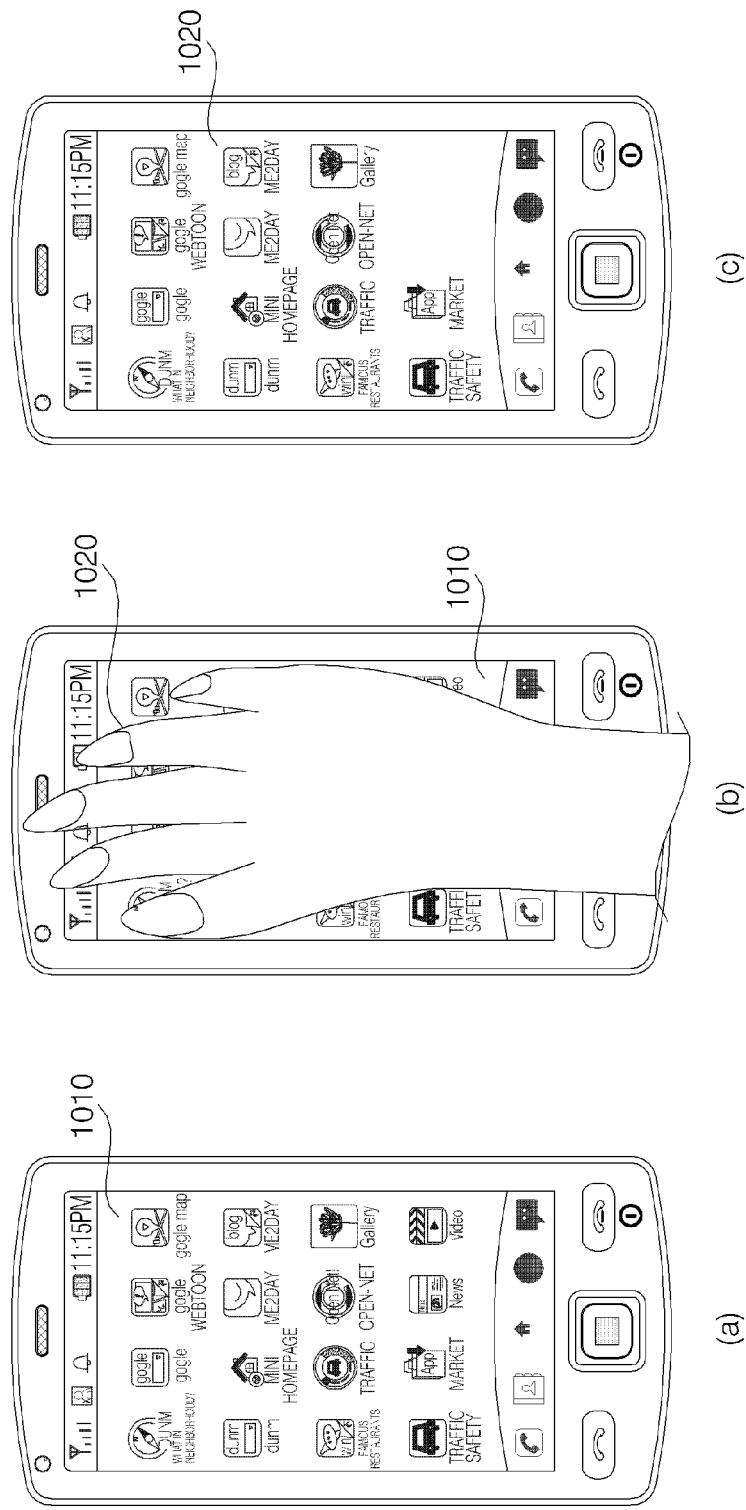

As shown in FIG. 8, if the user makes a gesture of lowering the mobile terminal 100 after initial authentication, the camera 121 disposed on the front surface of the mobile terminal 100 may be automatically activated to execute the eye recognition function. If a preregistered eye is not recognized, the authentication mode is automatically released and the first mode that restricts access to specific content is entered.

The method for operating the mobile terminal according to the embodiment of the present invention may further include switching to the first mode, upon sensing a touch at or approach to a specific position of the mobile terminal or upon sensing movement of the mobile terminal 100 in a predetermined pattern.

That is, when the user makes a gesture preset as a command to switch to the first mode, the mobile terminal 100 may be configured so as to switch to the first mode above all things irrespective of biometric information, thereby protecting privacy.

In some embodiments of the present invention, the sensor unit 140 may include an illuminance sensor 910 and/or a touch sensor 920.

FIG. 9(a) illustrates an exemplary layout of illuminance sensors 910 and FIG. 9(b) illustrates an exemplary layout of touch sensors 920. The user may switch the operation mode of the mobile terminal 100 to the first mode by changing illuminance by covering the illuminance sensors 910 or by touching the touch sensors 920 or advancing toward the proximity sensor 141.

When valid authentication is completed, a screen 1010 of the second mode, that is, the authentication mode is displayed as illustrated in FIG. 10(a). In this case, the second mode may also be switched to the first mode irrespective of sensing biometric information such as the face, eye, etc. of the user.

When the user covers the display 151 with a hand as illustrated in FIG. 10(b), the upper and lower illuminance sensors 910 sense darkness.

Thus, the controller 180 may recognize the hand covering, sets the released partial locking, and thus switch to the first mode, restricting access to specific content. Specifically, the controller 180 may control display of a screen 1020 in which locking-set content is locked and hiding-set content disappears in the first mode.

A push notification of the locked or hidden content may be performed by outputting a notification without, displaying contents, or by not displaying even a notification message.

Similarly, when the user grabs upper and lower parts of the mobile terminal 100 after authentication, the touch sensors 920 sense the user's grip and the mobile terminal 100 may switch to the second mode.

The method for operating the mobile terminal according to the embodiment of the present invention may further include switching to the second mode in which all content is accessible, upon acquisition of biometric information matching with the pre-stored authentication information. That is, upon sensing the registered user in the first mode, the mobile terminal 100 may release partial locking and switch to the authentication mode.

In this case, when the mobile terminal 100 switches to the second mode, it may display a notification message related to the predetermined content, which has been generated in the first mode. As described before, a notification message related to the predetermined content is not displayed in the first mode so that access to the predetermined content is restricted. Therefore, when the second mode is entered in response to sensing the registered user, a notification message received in the first mode is displayed to the user.

In addition, the method for operating the mobile terminal according to the embodiment of the preset invention may further include displaying a message notifying an item that has been changed in the first mode, when the second mode is entered. In this case, a step for recovering the changed item to the previous state may further be included.

Figure 11:
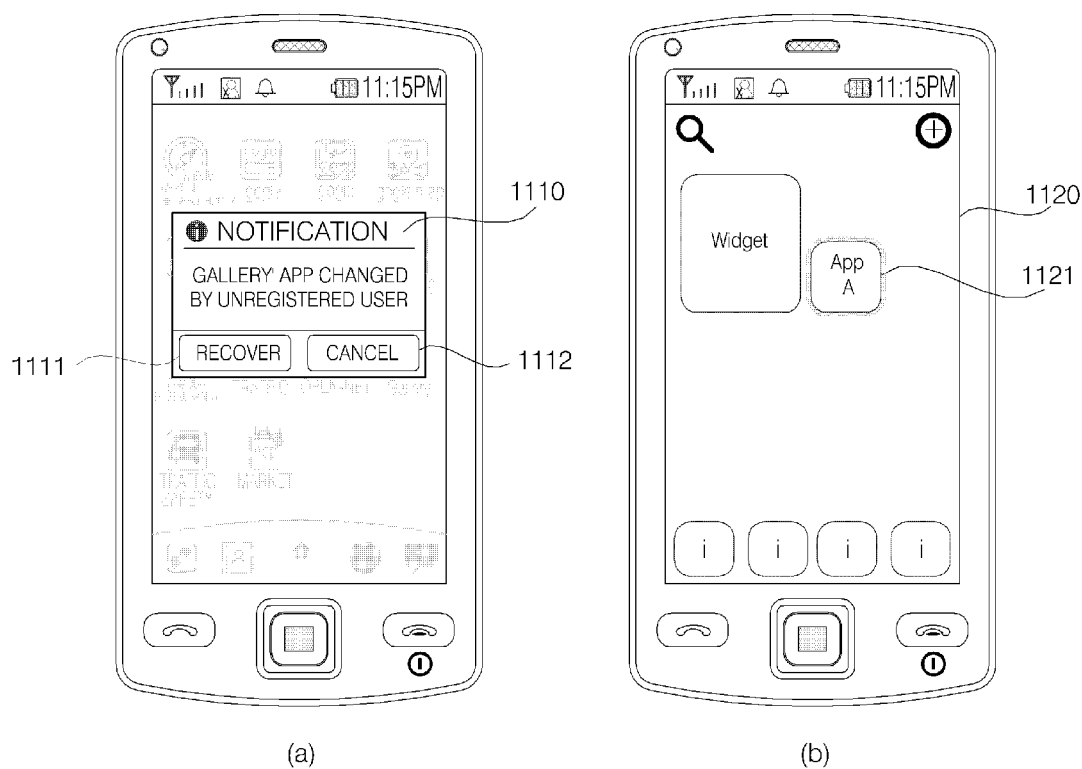

Referring to FIG. 11, when the second mode is entered, a notification pop-up 1110 regarding a changed item is displayed on the display 151 and the user may select 'recover' 1111 or 'cancel' 1112 to cancel recovery mode.

When the user selects 'recover' 1111, the current screen is switched to another screen in which along with a graphic effect of creating a new application icon for a deleted application or returning a shifted application to the previous position, a changed application 1121 may be recovered to an original page 1120.

The method for operating the mobile terminal according to the embodiment of the present invention may further include setting content for access restriction. The registered user may impose access restriction on specific content only in the second mode.

The access restriction step is characterized in that access-restricted content is displayed differently depending on types. The access-restricted content may be displayed distinctively from accessible content and may be displayed differently according to a setting type such as hiding or locking.

In the case of imposing access restriction on individual content, when the user touches a specific object for a predetermined time or longer in the second mode, a setting menu for content corresponding to the object may further be displayed and an access restriction setting may be performed for the content using the displayed setting menu.

For example, when the user presses an application icon for long on a home screen, auto hide, auto lock, and delete menu buttons are activated at the top of the screen. The user may set the lock function by dragging and dropping the icon to an intended edit button or by selecting a menu item after the icon selection.

Alternatively or additionally, the user may set content and the hiding or lock function by entering the setting menu on the home screen, or may set a plurality of pieces of content at one time on an edit screen.

FIGS. 12A to 12F illustrate an exemplary operation for applying a setting to an individual application.

Figure 12A:
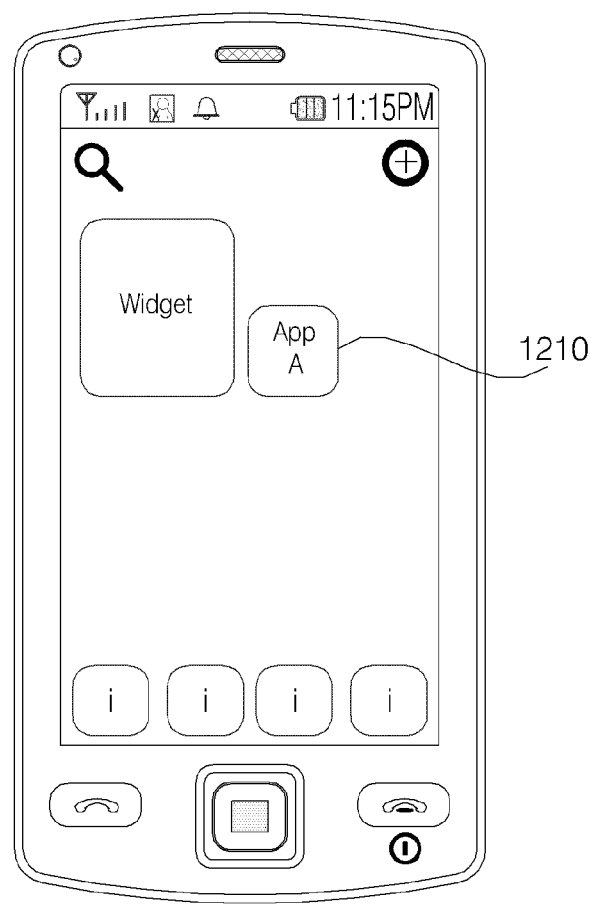

Referring to FIGS. 12A to 12F, even though an unregistered user touches the specific application for a predetermined time or longer in the first mode, the mobile terminal 100 is kept in the state illustrated in FIG. 12A, without displaying a setting screen.

In some embodiments of the present invention, upon receipt of a specific touch in the first mode, user authentication may be performed by entering a password as illustrated in FIG. 12B or in other user authentication procedures.

Figure 12C:
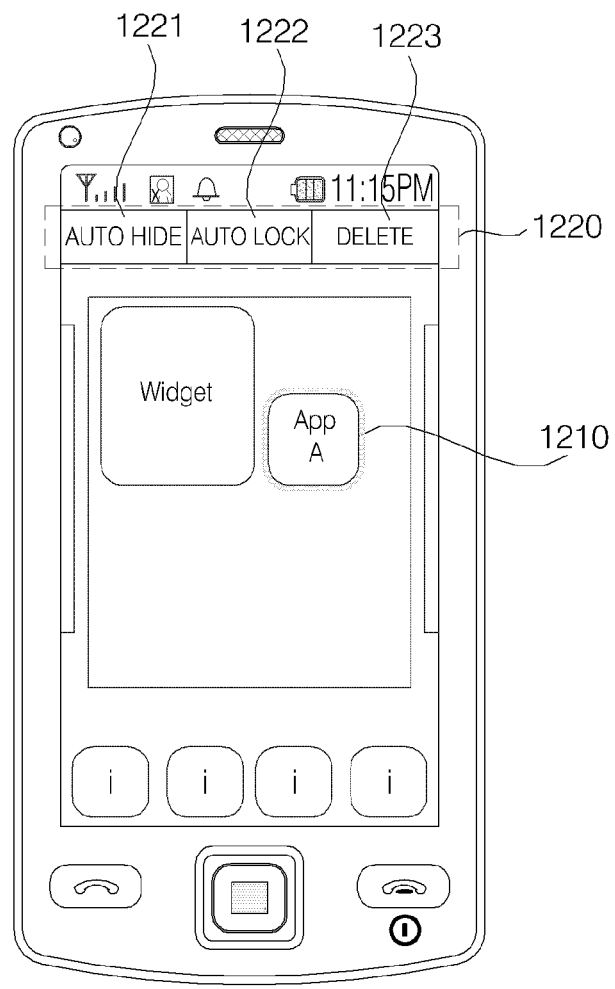

On the contrary, if the registered user touches a specific application 1210 for a predetermined time or longer in the second mode or after user authentication, a menu 1220 related to a locking setting may be activated, as illustrated in FIG. 12C.

The locking setting-related menu 1220 may include the menu items of auto hide 1221, auto lock 1222, and delete 1223.

Figure 12D:
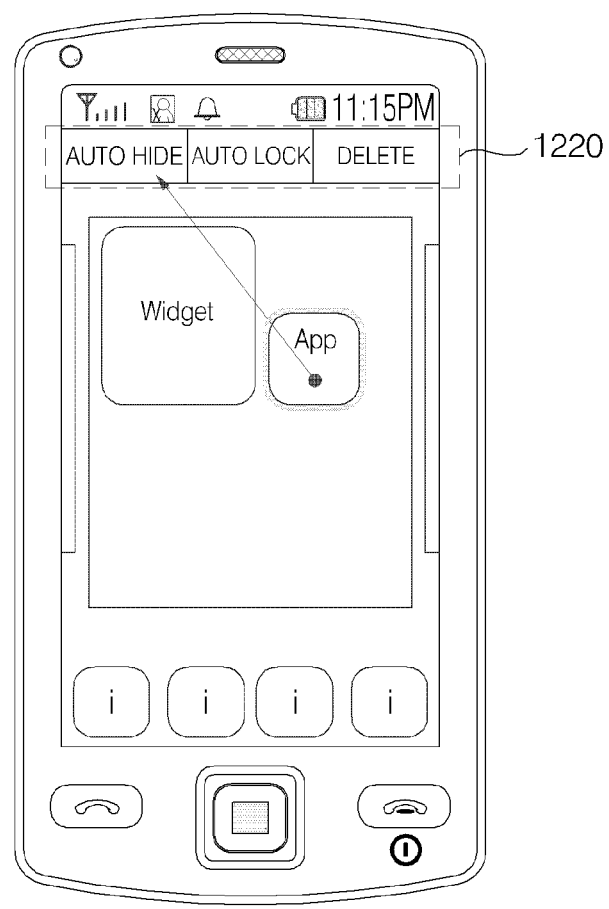
Figure 12E:
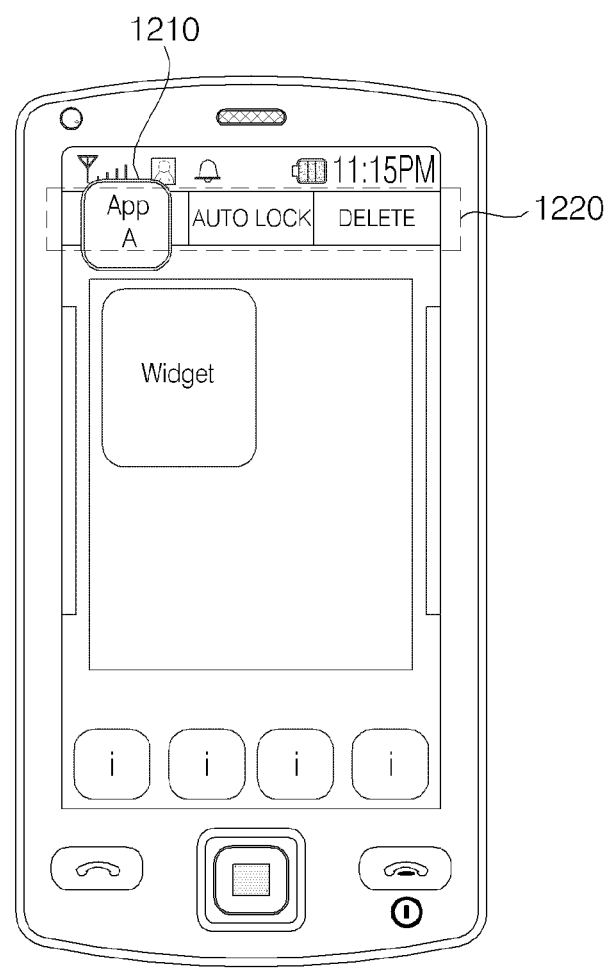

If the user wants an automatic hide setting for the application 1210 so that the application 1210 is hidden in the first mode, the user may drag the icon of the application 1210 toward the auto hide menu item 1221 as illustrated in FIG. 12D. Then the auto hide menu item 1221 may be opened to accommodate the icon as illustrated in FIG. 12E.

Figure 12F:
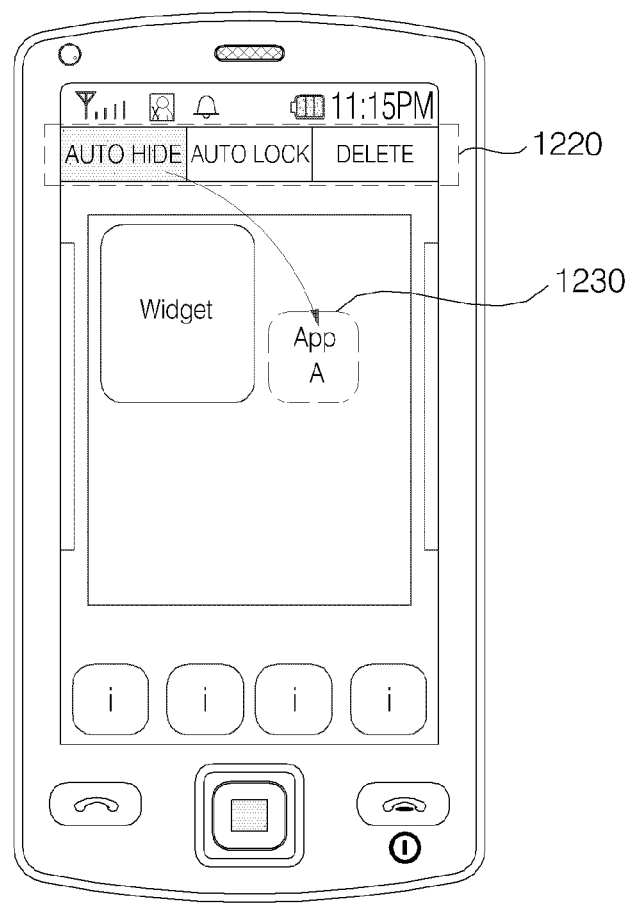

The automatic hide setting is completely applied to the application 1210 by dropping the icon into the auto hide menu item 1221. In this case, a graphic effect of making the icon spring from the auto hide menu item 1221 in a semi-transparent state and returning it to the original position may be exerted and an icon 1230 representing the hidden application may be displayed distinctively from other icons, as illustrated in FIG. 12F.

Figure 13:
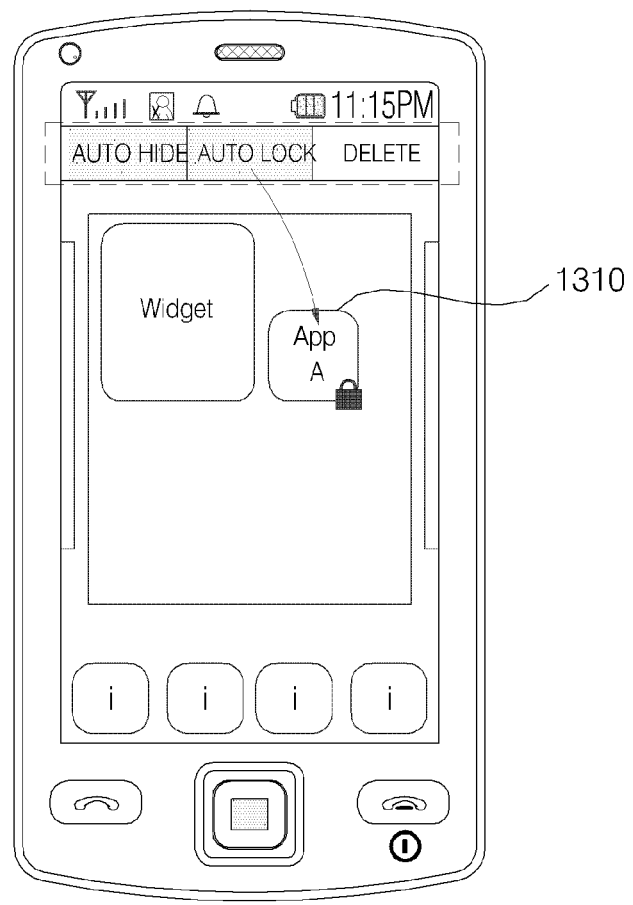

Referring to FIG. 13, an icon 1310 representing a locked application is displayed differently from the icon 1230 representing the hidden application.

Figure 14:
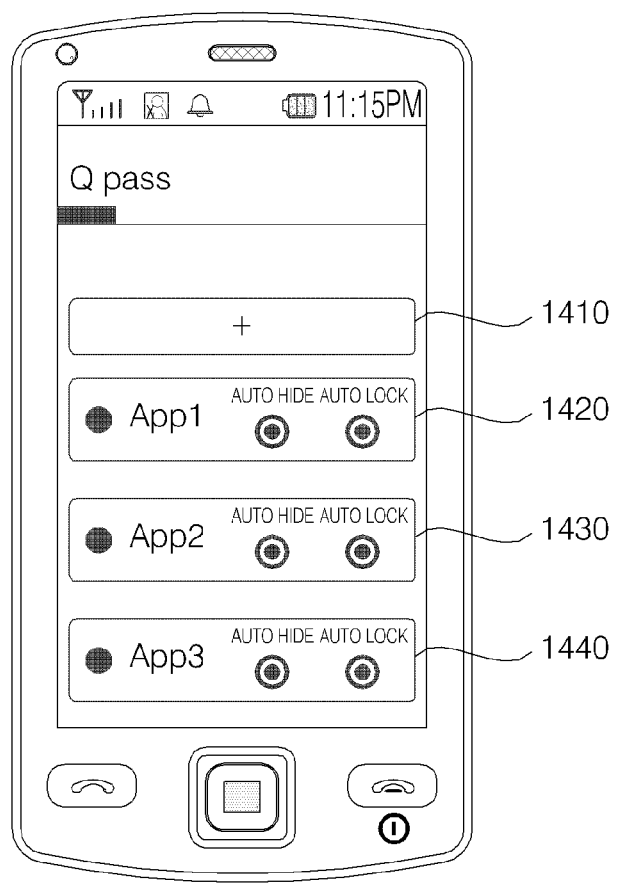
Figure 15A:
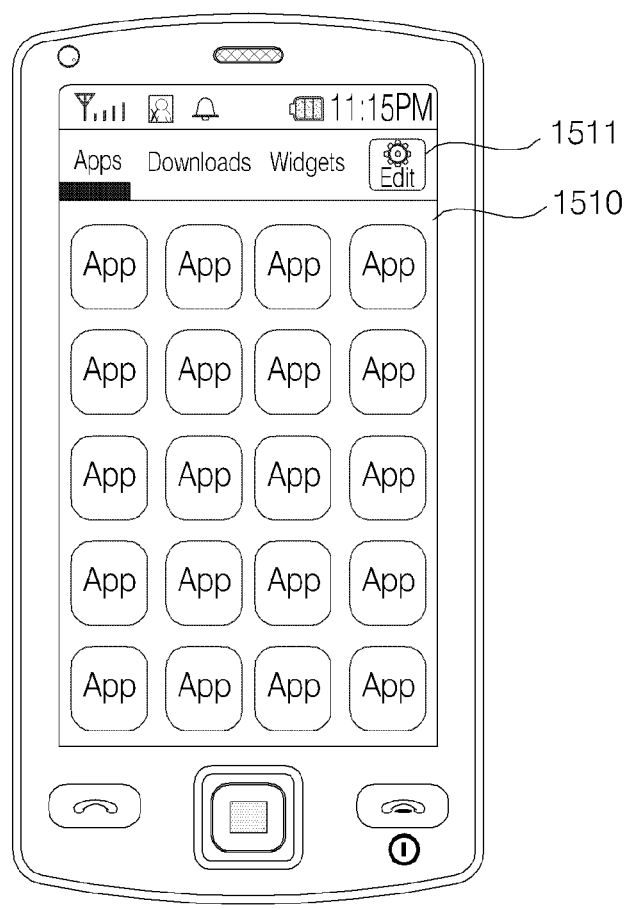
Figure 15B:
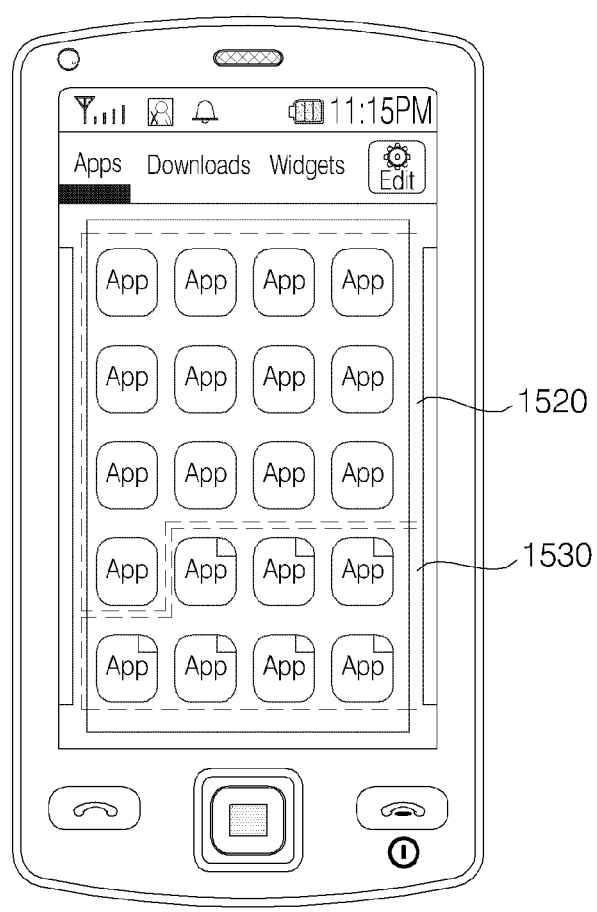
Figure 15C:
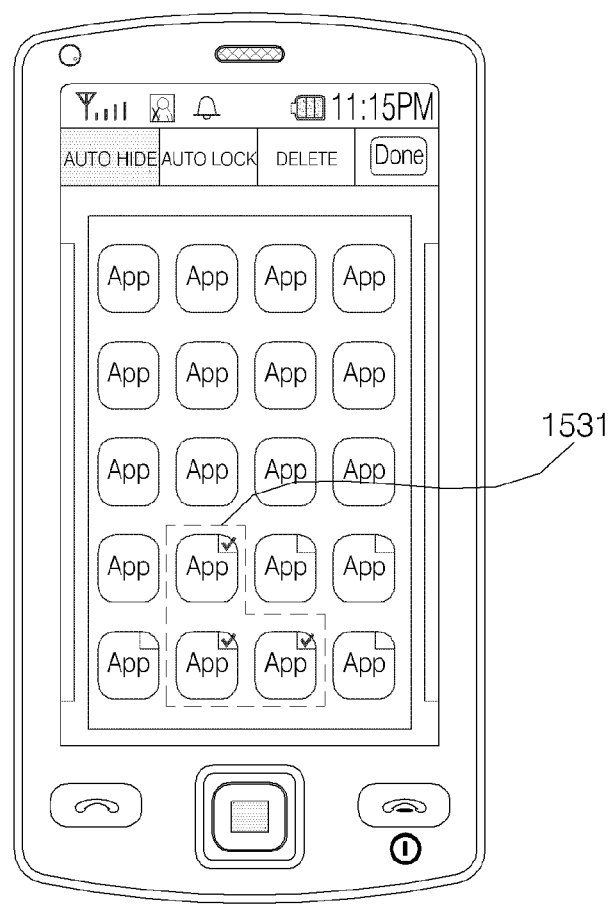
Figure 15D:
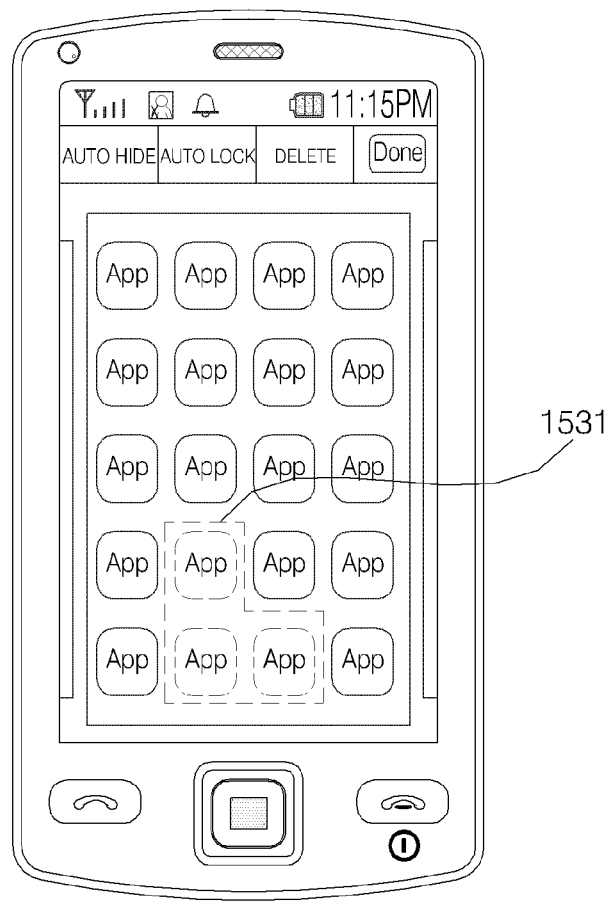
Figure 16A:
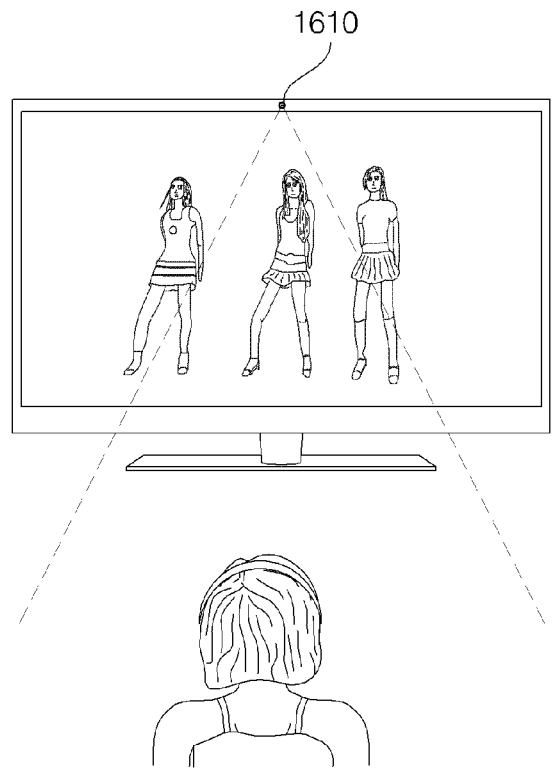
Figure 16B:
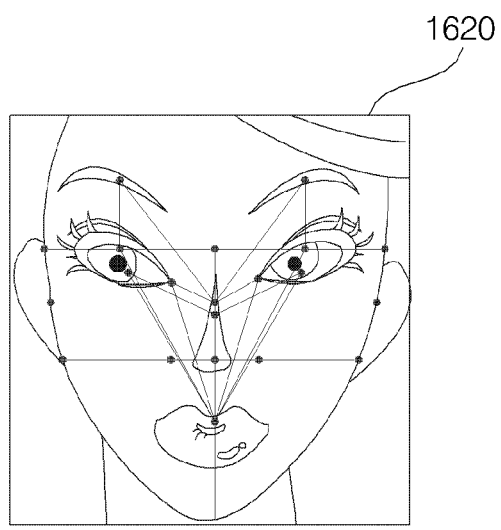
Figure 16C:
Figure 16D:
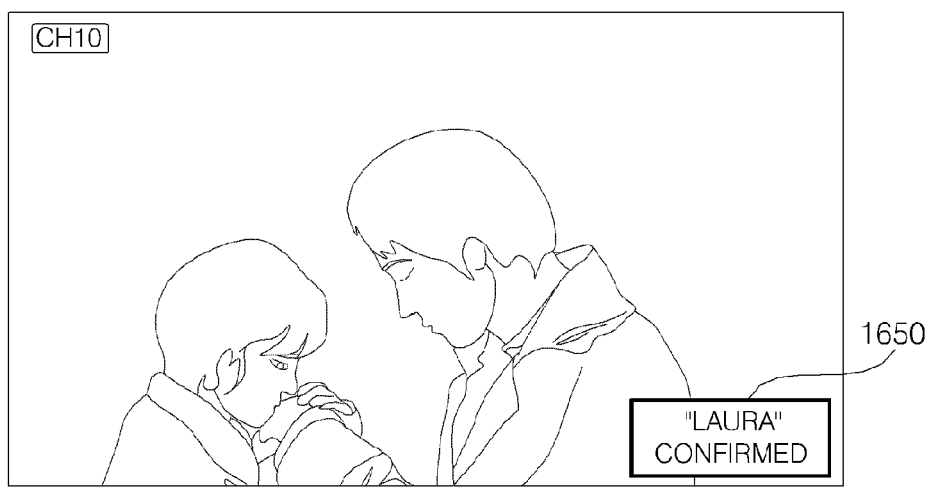

FIG. 14 illustrates an example of setting content, a hiding function, and a lock function through a setting menu of a home screen. The user may add content for access restriction by selecting an add menu item 1410 and turns on or off settings for the individual content in a content list 1420, 1430 and 1440.

FIGS. 15A to 15D illustrate an example of setting a plurality of applications on an edit screen at one time.

When the user selects an edit menu item 1511 on an application list screen 1510, uneditable application icons 1520 and editable application icons 1530 may be separately displayed and check boxes may be displayed at upper right ends of the editable application icons 1530.

When the user selects intended application icons 1531 and marks the check boxes of the selected application icons 1531, the auto hide, auto lock, and delete menu items may be activated at the top of the screen of the display 151 and then the user may set automatic hiding or locking for the applications.

If the user selects the auto hide menu item, the automatic hiding function is set for the applications corresponding to the selected icons 1531 and the selected icons 1531 may be rendered semi-transparent. If the auto lock function is set for the applications corresponding to the selected icons 1531, lock-shaped icons may be added to the selected icons 1531 to indicate the locked state.

In embodiments of the present invention, a double locking setting may be used in various manners.

Therefore, even when the mobile terminal is released from the general locked state, the mobile terminal may be partially locked or unlocked depending on use circumstances.

In addition, repeated user authentication inputs can be eliminated or minimized and access to specific content and functions can be restricted depending on whether a current user is an authorized one or not. Accordingly, the present invention enables fast execution and protects user privacy more effectively.

While the present invention has been described centering on the mobile terminal 100, it will be readily understood that the present invention is also applicable to electronic devices other than the mobile terminal 100.

FIGS. 16A to 16D illustrate an exemplary method for operating a TV according to an embodiment of the present invention.

Referring to FIGS. 16A to 16D, when one person is located within the shot range of a camera 1610, the person's face may be automatically recognized. During the automatic face recognition, feature points may be extracted from an acquired facial image 1620 and compared with pre-registered images. Thus it is determined whether the person is a registered user.

Upon completion of the face recognition, a recognized user confirmation window 1650 may be displayed over a displayed image 1630. When the user is confirmed, a confirmation message 1650 may be displayed and a customized service may be provided, such as log-in to a smart TV or an SNS site, synchronization of bookmarks in a mobile terminal, or reception of a message by connecting to the mobile terminal.

In some embodiments of the present invention, the customized service may be provided, when the user is additionally authenticated by a password or voice or the user confirms execution of the customized service.

Meanwhile, if the registered user is beyond the shot range of the camera or another person is sensed, the customized service is hidden or the user is logged out from the customized service.

As is apparent from the above description, the present invention can perform a privacy protection function conveniently without an additional operation and can partially restrict access to specific content by determining whether a user is authorized during an operation. Therefore, user convenience can be increased.

The display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The present invention may be implemented as code that can be written on a computer-readable recording medium and thus read by a processor in a display apparatus. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating a display apparatus, the method comprising:
  acquiring biometric information about a user through a camera or a sensor unit;
  comparing the acquired biometric information with pre-stored authentication information;
  switching the display apparatus to a first mode, if the acquired biometric information does not match with the pre-stored authentication information, the first mode restricting access to content predetermined from total content;
  switching the display apparatus to a second mode if the acquired authentication information matches with the pre-stored authentication information, the second mode allowing access to the total content;
  displaying a notification message related to the predetermined content when the second mode is entered, the predetermined content generated during operation in the first mode;
  displaying a notification pop-up indicating an item changed during operation in the first mode, when the second mode is entered;
  receiving a command selecting a recover item included the notification pop-up; and
  recovering the changed item to a previous state,
  wherein the authentication information is information about an iris, and
  wherein the recovering the changed item to a previous state comprises switching a current screen to another screen in which along with a graphic effect of creating a new application icon for a deleted application or returning a shifted application to the previous position, the changed item is recovered to a previous setting before entering the first mode.

2. The method according to claim 1, wherein the predetermined content is switched to a hidden or locked state in the first mode.

3. The method according to claim 2, wherein a notification message related to the content in the hidden state is not output in the first mode.

4. The method according to claim 1, further comprising setting content for access restriction.

5. The method according to claim 4, wherein the setting comprises displaying the access-restricted content differently according to the type of the access-restricted content.

6. The method according to claim 4, further comprising, when a specific object is touched for a predetermined time or longer in the second mode, displaying a setting menu for content corresponding to the object.

7. The method according to claim 4, further comprising:
  displaying a plurality of icons and a setting menu on a display;
  selecting at least one of the icons; and
  selecting one item in the setting menu or dragging the selected icon to one item in the setting menu.

8. The method according to claim 7, wherein icons that can be set for access restriction among the plurality of icons are displayed differently from the other icons.

* * * * *